United States Patent
Zhang et al.

(10) Patent No.: US 12,528,867 B2
(45) Date of Patent: Jan. 20, 2026

(54) FCRN ANTIBODY COMPOSITIONS

(71) Applicant: MOMENTA PHARMACEUTICALS, INC., Cambridge, MA (US)

(72) Inventors: Zhongli Zhang, Cambridge, MA (US); Michael Shifrin, Cambridge, MA (US); Nathaniel J. Washburn, Cambridge, MA (US); Aneta Liwosz, Cambridge, MA (US); Nasir Khan, Cambridge, MA (US)

(73) Assignee: Momenta Pharmaceuticals, Inc., Cambridge, MA (US)

( * ) Notice: Subject to any disclaimer, the term of this patent is extended or adjusted under 35 U.S.C. 154(b) by 1174 days.

(21) Appl. No.: 17/260,334

(22) PCT Filed: Jul. 19, 2019

(86) PCT No.: PCT/US2019/042615
§ 371 (c)(1),
(2) Date: Jan. 14, 2021

(87) PCT Pub. No.: WO2020/018910
PCT Pub. Date: Jan. 23, 2020

(65) Prior Publication Data
US 2021/0340251 A1    Nov. 4, 2021

Related U.S. Application Data

(60) Provisional application No. 62/701,367, filed on Jul. 20, 2018.

(51) Int. Cl.
| | |
|---|---|
| A61K 39/395 | (2006.01) |
| C07K 16/28 | (2006.01) |
| G01N 30/72 | (2006.01) |
| G01N 30/74 | (2006.01) |
| G01N 30/86 | (2006.01) |
| H01J 49/16 | (2006.01) |
| G01N 30/02 | (2006.01) |
| G01N 30/88 | (2006.01) |

(52) U.S. Cl.
CPC ....... *C07K 16/283* (2013.01); *G01N 30/7233* (2013.01); *G01N 30/74* (2013.01); *G01N 30/8624* (2013.01); *H01J 49/165* (2013.01); *G01N 2030/027* (2013.01); *G01N 2030/8831* (2013.01)

(58) Field of Classification Search
None
See application file for complete search history.

(56) References Cited

U.S. PATENT DOCUMENTS

| | | |
|---|---|---|
| 7,662,928 B2 | 2/2010 | Balthasar et al. |
| 9,943,642 B2 | 4/2018 | Kondo |
| 10,676,526 B2 | 6/2020 | Kehry et al. |
| 11,345,751 B2 | 5/2022 | Ling et al. |
| 11,732,047 B2 | 8/2023 | Kehry et al. |
| 11,773,168 B2 | 10/2023 | Ling et al. |
| 2003/0138417 A1 | 7/2003 | Kaisheva et al. |
| 2008/0248047 A1 | 10/2008 | Das et al. |
| 2009/0131639 A1 | 5/2009 | Kakuta et al. |
| 2009/0297535 A1 | 12/2009 | Kolkman et al. |
| 2010/0330076 A1 | 12/2010 | Georgiou et al. |
| 2011/0027262 A1 | 2/2011 | Das et al. |
| 2011/0059101 A9 | 3/2011 | Kolkman et al. |
| 2014/0235482 A1 | 8/2014 | George et al. |
| 2014/0308206 A1 | 10/2014 | Sexton et al. |
| 2015/0118240 A1 | 4/2015 | Finney et al. |
| 2015/0157709 A1 | 6/2015 | Everett et al. |
| 2015/0329628 A1 | 11/2015 | Antochshuk et al. |
| 2016/0194397 A1 | 7/2016 | TenHoor et al. |
| 2017/0209550 A1 | 7/2017 | Kjellman et al. |
| 2018/0016334 A1 | 1/2018 | Kehry et al. |
| 2019/0194277 A1 | 6/2019 | de Haard et al. |
| 2020/0003191 A1 | 1/2020 | Kraft et al. |
| 2020/0031917 A1 | 1/2020 | Kraft et al. |
| 2020/0299382 A1 | 9/2020 | Kehry et al. |
| 2021/0299255 A1 | 9/2021 | Zhang et al. |
| 2022/0064290 A1 | 3/2022 | Ling et al. |
| 2022/0144946 A1 | 5/2022 | Ramchandran et al. |

(Continued)

FOREIGN PATENT DOCUMENTS

| | | |
|---|---|---|
| CN | 101124245 A | 2/2008 |
| CN | 101421297 A | 4/2009 |

(Continued)

OTHER PUBLICATIONS

Chalker et al., Chemical Science, vol. 2, p. 1666-1676 (Year: 2011).*
Edelman et al., "The Covalent Structure Of An Entire Gimmunoglobulin Molecule," Proc. Natl. Acad. USA (1969) 63, pp. 78-85.
Extended European Search Report for European Patent Application No. 23189767.9 dated Jan. 17, 2024.
Extended European Search Report for European Patent Application No. 23195791.1 dated Jan. 17, 2024.
Haberger et al., "Rapid characterization of biotherapeutic proteins by size-exclusion chromatography coupled to native mass spectrometry," MABS (2016) vol. 8(2), pp. 331-339.

(Continued)

*Primary Examiner* — Yunsoo Kim
(74) *Attorney, Agent, or Firm* — BakerHostetler

(57) ABSTRACT

This disclosure pertains to compositions comprising an anti-FcRn antibody, M281. The compositions include the full, intact antibody and size variants thereof that not include two antibody heavy chains and to antibody light chains. Thus, a M281 pharmaceutical composition can include: an antibody comprising a heavy chain comprising the amino acid sequence of SEQ ID NO:2 and a light chain comprising the amino acid sequence of SEQ ID NO:1, wherein the composition comprises a major protein component having a molecular weight of 140,000-145,000 Da and a minor protein component of molecular weight 118,000-120,000 Da.

7 Claims, 6 Drawing Sheets

Specification includes a Sequence Listing.

(56) References Cited

U.S. PATENT DOCUMENTS

| | | |
|---|---|---|
| 2022/0259308 A1 | 8/2022 | Arroyo et al. |
| 2023/0049725 A1 | 2/2023 | Ling et al. |

FOREIGN PATENT DOCUMENTS

| | | | | |
|---|---|---|---|---|
| CN | 102149729 | A | 8/2011 | |
| CN | 103619353 | A | 3/2014 | |
| CN | 103717619 | A | 4/2014 | |
| CN | 103861102 | A | 6/2014 | |
| CN | 104479017 | A | 4/2015 | |
| CN | 106103476 | A | 11/2016 | |
| CN | 107567460 | B | 4/2021 | |
| EP | 0417191 | B1 | 3/1993 | |
| EP | 3010938 | A1 | 4/2016 | |
| EP | 3250610 | A2 | 12/2017 | |
| EP | 3491025 | B1 | 6/2019 | |
| JP | 2011523351 | A | 8/2011 | |
| JP | 2014523737 | A | 9/2014 | |
| JP | 2015163618 | A | 9/2015 | |
| JP | 2017516848 | A | 6/2017 | |
| JP | 2018-504907 | A | 2/2018 | |
| JP | 6853178 | B2 | 3/2021 | |
| JP | 7094941 | B2 | 7/2022 | |
| KR | 20140036267 | A | 3/2014 | |
| WO | 89/11298 | A1 | 11/1989 | |
| WO | 2004041862 | A2 | 5/2004 | |
| WO | 2005013912 | A2 | 2/2005 | |
| WO | 2005/072772 | A1 | 8/2005 | |
| WO | 2007087289 | A3 | 10/2008 | |
| WO | 2009124294 | A2 | 10/2009 | |
| WO | 2009131702 | A9 | 9/2010 | |
| WO | 2012167039 | A1 | 12/2012 | |
| WO | 2014019727 | A1 | 2/2014 | |
| WO | 2014204280 | A1 | 12/2014 | |
| WO | 2014179601 | A3 | 1/2015 | |
| WO | 2015100299 | A1 | 7/2015 | |
| WO | 2015167293 | A1 | 11/2015 | |
| WO | 2016065323 | A2 | 4/2016 | |
| WO | WO-2016123521 | A2 * | 8/2016 | ................ A61P 1/04 |
| WO | 2016123521 | A3 | 9/2016 | |
| WO | 2016183352 | A1 | 11/2016 | |
| WO | 2017015622 | A2 | 1/2017 | |
| WO | 2018023136 | A1 | 2/2018 | |
| WO | 2019110823 | A1 | 6/2019 | |
| WO | 2019118791 | A1 | 6/2019 | |
| WO | 2019160979 | A1 | 8/2019 | |
| WO | 2020/018910 | A1 | 1/2020 | |
| WO | 2020023310 | A1 | 1/2020 | |
| WO | 2020079086 | A1 | 4/2020 | |
| WO | 2020097099 | A1 | 5/2020 | |
| WO | 2021022249 | A1 | 2/2021 | |
| WO | 2021140202 | A1 | 7/2021 | |
| WO | 2021257668 | A1 | 12/2021 | |
| WO | 2022098955 | A1 | 5/2022 | |
| WO | 2022221239 | A1 | 10/2022 | |

OTHER PUBLICATIONS

Kortt et al., "Dimaric and trimeric antibodies: high avidity scFvs for cancer targeting", Biomolecular Engineering (2001) 18; 95-108.
Nonfinal Office Action mailed Aug. 5, 2022 received in U.S. Appl. No. 16/771,147.
Buyon et al., "Autoimmune associated congential heart block: integration of clinical and research clues in the management of the maternal/foetal dyad at risk", Journal of Internal Medicine (2009) 265: 653-662.
Nonfinal Office Action mailed Oct. 17, 2022 received in U.S. Appl. No. 17/519,811.
Ling, et al., "M281, and Anti-FcRn Antibody:Pharmacodynamics, Pharmacokinetics, and Safety Across the Full Range of IgG Reduction in a First-in-Human Study", Clinical Pharmacology & Therapeutics (2019) vol. 105 No. 4, pp. 1031-1039.
Lazaridis, et al., "Autoantibody Specificities in Myasthenia Gravis; Implications for Improved Diagnostics and Therapeutics", Front. Immunol. (2020) 14; 11:212.
Roopenian, et. al., "Albumin-deficient mouse models for studying metabolism of of human albumin and pharmacokinetics of albumin-based drugs", mABS (2015) vol. 7, Issue 2, pp. 344-351.
Hui-Juan et al., "Prokaryotic expression of porcine FcRn-CT and prepartion of polyclonal antibody", Chinese Journal of Vetenary Science (2012) vol. 32, No. 2, pp. 262-271.
Zdravic et al., "Fetal and neonatal alloimmune thrombocytopenia", Seminars in Fetal & neonatal Medicine (2016) 21; pp. 19-27.
Tannemaat et al., "Emerging therapies for autoimmune myasthenia gravis: Towards treatment without corticosteroids", Neuromuscular Disorders (2020 30: pp. 111-119.
Yu et al., "Estimation of Hemolytic Disease of the Newborn in the United States from 1996-2010", (2021).
Nonfinal Office Action mailed Jun. 29, 2021 received in U.S. Appl. No. 16/321,801.
Kussie et al., "A Single Engineered Amino Acid Substitution Changes Antibody Fine Specificity", Journal of Immunology (1994) 152(1): pp. 146-152.
Chen et al., "Enhancement and destruction of antibody function by somatic mutation: unequal occurrence is controlled by V gene combinatorial associations", The EMBO Journal (1995) vol. 14 No. 12, pp. 2784-2794.
Ling et al., "M281: A Therapeutic Anti-FcRn Blocking Antibody for Rapid Clearance of IgG and IgG Autoantibodies in Immune Cytopenias and Other Auto/Allm-Immune Disease", Blood (2015) 126, 23: 3472.
Daugherty et al., "Formulation and Delivery Issues for Monoclonal Antibody Therapeutics", Current Trends In Monoclonal Antibody Development and Manufacturing (2010) pp. 103-129.
Extended European Search Report Application No. EP19840429. mailed Mar. 18, 2022.
Sharma et al., "The Formulation and Delivery of Monoclonal Antibodies", Therapeutic Monoclonal Antibodies: From Bench to Clinic (2009) pp. 1-37.
Singapore Search Report and Written Opinion in Application No. 10202007232W, dated Feb. 17, 2022.
Wang, et al., "Antibody Structure, Instability, and Formulation", Journal of Pharmaceutical Sciences, (2007) vol. 96, No. 1.
Warne et al., "Development of high concentration protein biopharmaceuticals: The use of platform approaches in formulation development", European Journal of Pharmaceutics and Biopharmaceutics (2011) 78: pp. 208-212.
Casipit et al., "Improving the Binding Affinity of an Antibody using Molecular Modeling and Site-Directed Mutagenesis," Protein Science, Aug. 1, 1998, 7:1671-1680.
Chien et al., "Significant structural and functional change of an antigen-binding site by a distant amino acid substitution: Proposal of a structural mechanism,", Proc. Natl. Acad. Sci. USA, 1989, 86(14): 5532-5536.
Christianson et al., "Monoclonal antibodies directed against human FcRn and their applications," MAbs, 2012, 4(2):208-216.
Committee on Obstetric Practice American Institute of Ultrasound in Medicine Society for Maternal-Fetal Medicine, "Committee Opinion. No. 700: Methods for Estimating the Due Date," Obstetrics & Gynecology, May 2017, 129(5):e150-e154.
Ellinger et al., "Overexpression of the human neonatal Fc-receptor alpha-chain in trophoblast-derived BeWo cells increases cellular retention of beta2-microglobulin," Placenta., 2005, 26(2-3): 171-182.
Hiroyuki et al., "Tryptophan H33 plays an important role in pyrimidine (6-4) pyrimidone photoproduct binding by a higli-affinity antibody," Protein Engineering, 1999, 12(10): 879-884.
Hoftman et al., "Newborn illnesses caused by transplacental antibodies," Adv. Pediatr., 2008, 55: 271-304.
Hutson et al., "The human placental perfusion model: a systematic review and development of a model to predict in vivo transfer of theraeputic drugs," Clin. Pharmacol. Ther., 2011, 90(1): 67-76.
International Preliminary Report on Patentability in International Application No. PCT/US2017/044765, dated Jan. 29, 2019, 9 pages.

(56) References Cited

OTHER PUBLICATIONS

International Preliminary Report on Patentability in International Application No. PCT/US2018/065568, dated Jun. 16, 2020, 10 pages.
International Preliminary Report on Patentability in International Applications No. PCT/US2016/015720, dated Aug. 1, 2017.
International Search Report and Written Opinion in International Application No. PCT/US16/15720, dated Jul. 26, 2016.
International Search Report and Written Opinion in International Application No. PCT/US2017/44765, dated Jan. 9, 2018, 14 pages.
International Search Report and Written Opinion in International Application No. PCT/US2018/065568, dated Apr. 2, 2019, 14 pages.
Junghans and Anderson, "The protection receptor for IgG catabolismis the beta2-microglobulin-containing neonatal intestinal transport receptor," PNAS, May 1996, 93:5512-5516.
Kobrin et al., "A V Region Mutation in Phosphocholine-Binding Monoclonal Antibody Results in Loss of Antigen Binding,", J. of Immunol., Mar. 15, 1991, 146(6): 2017-2020.
Li et al., "The Maternal Immune Response to Fetal Platelet GPibalpha Causes Frequent Miscarriage in Mice That Can Be Prevented by Intravenous IgG and anti-FcRn Therapies," J. Clin. Invest., Nov. 2011, 121(11): 4537-4547.
Ling et al., "32: M281, an anti-FcRn antibody, inhibits IgG transfer in a human ex-vivo placental perfusion model," Jan. 2019, 220(1): 32.
Liu et al., "Amelioration of Experimental Autoimmune Myasthenia Gravis in Rats by Neonatal FcR Blockage," J. of Immunol., Apr. 15, 2007, 178(8): 5390-5398.
Mahadevan eta I., "Placental transfer of anti-tumor necrosis factor agents in pregnant patients with inflammatory bowel disease," Clin. Gastroenterol. Hepatol., 2013, 11(3): 286-292.
Maleck, "Ex vivo human placenta models: transport of immunoglobulin G and its subclasses," Vaccine, 2003, 21: 3362-3364.
Mathiesen eta I., "Quality assessment of a placental perfusion protocol," Reproductive Toxicology, 2010, 30: 138-146.
Morgan et al., "The effect of intravenous immunoglobulin on placental transfer of a platelet-specific antibody: Anti-P1A1," Transfusion Medicine, 1991, 1: 209-216.
Mørck et al., "Placental transport and in vitro effects of Bisphenol A," Reproductive Toxicol., 2010, 30: 131-137.
Nanovskaya et al., "Transplacental Transfer and Metabolism of Buprenophine," J. Pharmacol. Exp. Ther., 2002, 300 (1): 26-33.
Panka et al., "Defining the Structural Correlates Responsible for Loss of Arsonate Affinity in an IDCR Antibody Isolated From an Autoimmune Mouse," Mol. Immunol.,I Aug. 1, 1993, 30(11): 1013-1020.
Porter et al., "Certolizumab pegol does not bind the neonatal Fc receptor (FcRn): Consequences for FcRn-mediated in vitro transcytosis and ex vivo human placental transfer," J. Repro. Imm., 2016, 116: 7-12.
Roopenian et al., "Clinical Ramifications of the MHC Family Fc Receptor FcRn," J. Clin. Immunol., 2010, 30(6): 790-797.
Roopenian et al., "FcRn: the neonatal Fc receptor comes of age," Nature Immunol., 2007, 7: 715-25.
Rudikoff et al., "Single Amino Acid Substitution Altering Antigen-Binding Specificity," Proc. Natl. Acad. Sci. USA, Mar. 1, 1982, 79: 1979-1983.
Schildbach et al., "Modulation of antibody affinity by a non-contact residue," Protein Science, 1993, 2: 206-214.
Schneider et al., "Effect of flow rate ratio on the diffusion of antipyrine and 3H20 in the isolated dually in vitro perfused lobe of the human placenta," Contrib. Gynecol. Obstet., 1985, 13: 114-123.
Schneider et al., "Transfer across the perfused human placenta of antipyrine, sodium and leucine," Am. J. Obstet. Gynecol., 1972, 114: 822-828.
Singapore Search Report and Written Opinion in Singapore Application No. 11201705475Q, dated Jul. 31, 2018.
Urbaniak et al., "Transfer of anti-D antibodies across the isolated perfused human placental lobule and inhibition by high dose intravenous immunoglobulin: a possible mechanism of action," Br. J. Hematol., 1997, 96: 186-93.
Urbaniak et al., "Variable inhibition of placental IgG transfer in vitro with commercial IVgG preparations," Br. J. Haematol., 1999, 107: 815-817.
Winkler et al., "Changing the Antigen Binding Specificity by Single Point Mutations of an Anti-p24 (HIV-1) Antibody," J. of Immunol., Oct. 15, 2000, 165(8): 4505-4514.
Zhu et al., "MHC class I-related neonatal Fc receptor for IgG is functionally expressed in monocytes, intestinal macrophages, and dendritic cells," J. Immunol., 2001, 166(5): 3266-3276.
Nonfinal Office Action mailed Jan. 22, 2022 received in U.S. Appl. No. 16/771,147.
Notice of Allowance mailed Jan. 28, 2022 received in U.S. Appl. No. 16/321,801.
International Search Report and Written Opinion in International Application No. PCT/US2021/058188, dated Apr. 5, 2022.
International Search Report and Witten Opinion in International Application No. PCT/US2022/024354, dated Sep. 12, 2022.
Deng et al., "Neonatal Alloimmune Thrombocytopenia Associated with Maternal HLA Antibodies," Chinese Journal Of Blood Transfusion (Sep. 2016) vol. 29, No. 9, pp. 935-937.
European Search Report for European Patent Application No. 16744204.5 dated Jul. 24, 2018.
Ling et al., "Targeting the Neonatal Fc Receptor (FcRn) to Mediate Autoantibody Clearance in IgG-Driven Autoimmune Disease," Momenta Pharmaceuticals, Inc., Abstract THU0057, Presented at the Annual European Congress of Rheumatology, Jun. 10-13, 2015.
Wilcox et al., "Review of Transplacental Antibody Transfer," Frontiers in Immunology (Oct. 2017) vol. 8, Art. 1294, pp. 1-12.
Kang et al., "Rapid Formulation Development for Monoclonal Antibodies," BioProcess International (Apr. 2016) pp. 1-7.
European Search Report for European Patent Application No. 19838652.6 dated Nov. 10, 2022.
European Search Report for European Patent Application No. 20846154.1 dated Jul. 19, 2023.
International Preliminary Report on Patentability for International PCT Application No. PCT/US2019/042597 dated Feb. 4, 2021.
International Preliminary Report on Patentability for International PCT Application No. PCT/US2020/044731 dated Feb. 10, 2022.
International Preliminary Report on Patentability for International PCT Application No. PCT/US2021/058188 dated May 19, 2023.
European Search Repot for European Patent Application No. 17835436.1.
Akilesh et al., "The MHC class I-like Fc receptor promotes humorally mediated autoimmune disease," J Clin Invest (2004) 113(9): 1328-1333.
Chung et al., "Effects of Antibody Disulfide Bond Reduction on Purification Process Performance and Final Drug Substance Stability," Biotechnol. Bioeng. (Jun. 2017) vol. 114, No. 6, pp. 1264-1274.
Miniaci et al., "Loading Dose," StatPearls (2022) pp. 1-3.
Notice of Allowance for U.S. Appl. No. 16/771,147 dated May 19, 2023.
Qin, "Modern Surgery for Obstetric and Gynecological Diseases," Scientific Technical Documentation Press, 1st edition (2017) p. 172.
Vlasak et al., "Fragmentation of Monoclonal Antibodies," mAbs. (2011) 3(3) pp. 253-663.
International Preliminary Report on Patentability for International PCT Application No. PCT/US2022/024354 dated Oct. 26, 2023.
Restriction Requirement for U.S. Appl. No. 15/546,870 dated Jun. 6, 2019.
Restriction Requirement for U.S. Appl. No. 16/825,066 dated Aug. 4, 2022.
Nonfinal Office Action mailed Nov. 8, 2023 received in U.S. Appl. No. 17/519,811.
Final Office Action for U.S. Appl. No. 16/321,801 dated Dec. 3, 2021.
Final Office Action for U.S. Appl. No. 17/519,811 dated Apr. 26, 2023.

(56) References Cited

OTHER PUBLICATIONS

Notice of Allowance for U.S. Appl. No. 15/546,870 dated Apr. 3, 2020.
Notice of Allowance for U.S. Appl. No. 15/546,870 dated Mar. 17, 2020.
Notice of Allowance for U.S. Appl. No. 16/825,066 dated Apr. 12, 2023.
Liu, "Medical Immunology," China Press of Traditional Chinese Medicine, 1st edition (2008) p. 28.
Non-Final Office Action for U.S. Appl. No. 15/546,870 dated Oct. 18, 2019.
Vajdos et al., "Comprehensive Functional Maps of the Antigen-binding Site of an Anti-ErbB2 Antibody Obtained with Shotgun Scanning Mutagenesis," Journal of Molecular Biology (2002), vol. 320, pp. 415-428.
Brown et al., "Tolerance to Single, but Not Multiple, Amino Acid Replacements in Antibody VH CDR2," Journal of Immunology (1996), vol. 156, pp. 3285-3291.
Roy et al., "M281, an Anti-FcRn Antibody, Inhibits IgG Transfer in a Human Ex Vivo Placental Perfusion Model," American Journal of Obstetrics & Gynecology (May 2109) 498.e1-e9.
Zuercher et al., "Next-Generation Fc Receptor-Targeting Biologics for Autoimmune Diseases," Autoimmunity Reviews (2019) vol. 18, No. 10, Art. 102366, pp. 1-9.
International Preliminary Report on Patentability for International PCT Application No. PCT/US2019/042615 dated Feb. 4, 2021.
Notice of Allowance mailed Nov. 22, 2022 received in U.S. Appl. No. 16/825,066.
Christensen, D et al., Trehalose preserves DDA/TDB liposomes and their adjuvant effect during freeze-drying, Biochimica et Biophysica Acta., Sep. 2007, Epub May 13, 2007, vol. 1768, No. 9, pp. 2120-2129.
International Search Report and Written Opinion in International Application No. PCT/US2019/042597, dated Nov. 26, 2019.
International Search Report and Written Opinion in International Application No. PCT/US2019/042615, dated Nov. 15, 2019.
International Search Report and Written Opinion in International Application No. PCT/US2020/044731, dated Dec. 22, 2020.
Montes, T et al., Genetic Modification of the Penicillin G Acylase Surface to Improve its Reversible Immobilization on Ionic Exchangers, Applied and Encironmental Microbiology, Jan. 2007, Epub Nov. 10, 2006, vol. 73, No. 1, pp. 312-319.
Whittamker, MM et al., Burst Kinetics and Redoc Transformations of the Active Site Manganesse Ion in Oxalate Oxidase: Implications for the Catalytic Mechanism, The Journal of Biological Chemistry, Mar. 9, 2007, Epub Jan. 8, 2007, vol. 282, No. 10, pp. 7011-7023.
"Vivacity MG Phase 2 Interim Analysis Topline Results", Myasthenia Gravis Foundation of America (MGFA), 2020, 22 pages.
Aggarwal, R. et al., "Complications and Treatment Use Associated with Long-term Oral Corticosteroid Therapy among Patients with Dermatomyositis or Polymyositis", Annals of the Rheumatic Diseases, vol. 83, 2024, pp. 618-619.
Antozzi, C. et al., "Efficacy and Safety of Nipocalimab in Patients with Generalized Myasthenia Gravis—Top Line Results from the Double-Blind, Placebo-Controlled, Randomized Phase 3 Vivacity-MG3 study", European Journal of Neurology, vol. 31, Suppl. 1, 2024, p. 69.
Antozzi, C. et al., "Safety and Efficacy of Nipocalimab in Patients With Generalized Myasthenia Gravis", Neurology, vol. 102, No. 2:e207937, Jan. 23, 2024.
Bei, D. et al., "Pharmacokinetic Drug Interaction Between Nipocalimab and Fremanezumab in Healthy Subjects", American Association of Neuromuscular and Electrodiagnostic Medicine (AANEM), Sep. 21-24, 2022, 1 page.
Boggia, G. M. et al., "Diagnostic Journey and Burden of Disease in Chronic Inflammatory Demyelinating Polyneuropathy: Results from a Real-World Survey", European Journal of Neurology, vol. 31, Suppl. 1, 2024, pp. 168.
Bohn, J. et al., "Real-world treatment pathways among adult patients with myasthenia gravis", Muscular Dystrophy Association, 2023.
Borsi, A. et al., "Changing priorities among physician reported reasons for choice of maintenance pharmacological treatments amongst gMG patients across 5 European countries", Value in Health, vol. 25, S12, 2022, pp. S475-S476.
Borsi, A. et al., "Changing priorities among physician reported reasons for choice of pharmacological gMG treatments across 5 European countries", American Association of Neuromuscular and Electrodiagnostic Medicine (AANEM), 2023.
Borsi, A. et al., "Delayed Diagnosis Amongst Generalized Myasthenia Gravis Patients: Results from a European Real World Study", American Association of Neuromuscular and Electrodiagnostic Medicine (AANEM), 2023.
Borsi, A. et al., "Delayed diagnosis amongst gMG patients: Results from an international real-world study", Value in Health, vol. 25, Supp. 12, 2022, pp. S468-S469.
Borsi, A. et al., "Physician Reported Reasons for Choice of CIDP Treatment Across 5 European Countries: Results from a Real-World Survey", Value in Health, vol. 26, S12, 2023, pp. S310.
Cai, Q. et al., "Direct and Indirect Costs Among Employed Patients with Myasthenia Gravis in Sweden", Value in Health, vol. 26, No. S6, 2023.pp. S133.
Cai, Q. et al., "Long-term Healthcare Resource Utilization and Costs among Patients with Myasthenia Gravis: A Swedish Nationwide Population-based Study", Neuroepidemiology, 2024.
Cai, Q. et al., "Long-term Healthcare Resource Utilization and Costs Among Patients With Newly Diagnosed Myasthenia Gravis: A Swedish Nationwide Population-based Study", American Association of Neuromuscular and Electrodiagnostic Medicine, 2023.
Cai, Q. et al., "Productivity Loss In Patients With Chronic Inflammatory Demyelinating Polyneuropathy: A Nationwide Population-Based Study In Sweden", Peripheral Nerve Society (PNS), May 14-17, 2022, 1 page.
Cai, Q. et al., "Treatment and Dosage Patterns of Oral Corticosteroids among Patients with Myasthenia Gravis: A Tale of Two Countries", Value in Health, vol. 26, S12, 2023, pp. S300.
Cherif, H. et al., "Overall Survival of Warm Autoimmune Hemolytic Anemia in Sweden: A Nationwide Population-based Study", European Hematology Association, 2024.
Cho, Y. K. et al., "Literature Based IVIG-IgG-Hemoglobin Modeling and Simulation in warm Autoimmune Hemolytic Anemia", American Conference on Pharmacometrics, 2023, 1 page.
Choudhury, A. et al., "Mode of Nipocalimab Action and Pharmacology in Cells and Preclinical Models", Blood, vol. 140, Supp. 1, 2022, p. 8161.8162.
Dosne, A. et al., "IgG and anti-AChR Antibody Reduction Explain Nipocalimab Effect on MG-ADL Score Improvement in Patients with gMG", European Journal of Neurology, vol. 30, S1, 2023, pp. 355.
Dosne, A.-G. et al., "Reduced Immunoglobulin G and Anti-acetylcholine Receptor Antibodies Explain Nipocalimab Effect on Improved Myasthenia Gravis Activities of Daily Living Score in Generalized Myasthenia Gravis Patients", American Association of Neuromuscular and Electrodiagnostic Medicine, 2023.
Ebrahim, T. et al., "Nipocalimab Mechanism of Action, Safety, and Tolerability", National Organization for Rare Disorders (NORD), 2022, 1 page.
Ebrahim, T. et al., "Study Design of ENERGY, a Phase 2/3 Clinical Trial to Assess the Efficacy and Safety of Nipocalimab in Warm Autoimmune Hemolytic Anemia (wAIHA)", National Organization for Rare Disorders (NORD), 2022.
Fallach, N. et al., "Utilization of healthcare resources and costs of haemolytic disease of foetus and newborn (HDFN) in Israel", Value in Health, vol. 26, S12, 2023, S300.
Fassett, M. J. et al., "Maternal-Infant Characteristics and Perinatal Outcomes by Hemolytic Disease of the Fetus and Newborn (HDFN)", Reprod. Sci., vol. 31, Suppl 1, 2024, pp. 289A.
Fitzgibbon, M. et al., "Clinical outcomes of standard of care in pregnant participants and their offspring at high risk of early-onset severe hemolytic disease of the fetus and newborn (CLARITY Study)", Joint European Neonatal Societies (jENS), 2023.

(56) References Cited

OTHER PUBLICATIONS

Ford, L. et al., "A Phase 2/3 Placebo-Controlled, Parallel Group, Randomized Withdrawal Study to Evaluate the Efficacy and Safety of Nipocalimab for Adults with Chronic Inflammatory Demyelinating Polyneuropathy: the ARISE study", American Association of Neuromuscular and Electrodiagnostic Medicine (AANEM), 2022.
Ford, L. et al., "Efficacy and Safety of Nipocalimab for Adults with Chronic Inflammatory Demyelinating Polyneuropathy: The ARISE Study", Peripheral Nerve Society (PNS), 2023.
Gottenberg, J. -E. et al., Efficacy and safety of nipocalimab, an anti-FcRn monoclonal antibody, in primary Sjogren's disease: results from a phase 2, multicenter, randomized, placebo-controlled, double-blind study (DAHLIAS)', Asia Pacific League of Associations for Rheumatology, 2024.
Gottenberg, J .- E et al., "Sjogren's disease activity and clinical characteristics of patients with seropositive and seronegative anti-SSA/Ro and anti-SSB/La antibody test results", Annals of the Rheumatic Diseases, vol. 83, 2024, pp. 872-873.
Govindarajan, R. et al., "Leveraging AI to characterize the real-world experience of anxiety and fear during the myasthenia gravis diagnosis journey", Muscular Dystrophy Association, 2024.
Govindarajan, R. et al., "MGNation: A Real-World Study Capturing Patient, Healthcare Professional and Caregiver Perspectives", Myasthenia Gravis Foundation of America, 2023.
Guptill, J. et al., "Phase 2 Trial Evaluating the FcRn Antagonist Nipocalimab in Adults with Generalized Myasthenia Gravis", International Congress on Neuromuscular Diseases (ICNMD), 20211, 1 page.
Gwathmey, K. et al., "Uncontrolled Myasthenia Gravis can Contribute to Additional Stress Burden and Adverse Mental Health Experiences", American Academy of Neurology, 2024.
Heerlein, K. et al., "Benefit of a Myasthenia Gravis Website for Stimulating Interest in Clinical Trial Participation: A Pilot Study", National Organization for Rare Disorders (NORD), 2022, 1 page.
Huang, S. et al., "Retrospective Study of Select Adverse Events of Special Interest Associated With Corticosteroid Use in Myasthenia Gravis", European Journal of Neurology, vol. 30, S1, 2023, pp. 358-359.
Hubbard, J. et al., "Design of a Phase 2, Multicenter, Randomized, Placebo-Controlled, Double-Blind Study to Assess the Efficacy and Safety of Nipocalimab in Adults With Primary Sjogren's Syndrome", Asia Pacific League of Associations for Rheumatology (APLAR), 2022, 1 page.
Hubbard, J. et al., "Design of a Phase 2, Multicenter, Randomized, Placebo-Controlled, Double-Blind Study to Assess the Efficacy and Safety of Nipocalimab in Adults With Primary Sjogren's Syndrome", International Congress on Systemic Lupus Erythematosus and the Korean College of Rheumatology Annual Scientific Meeting & International Symposium, 2023.
Hubbard, J. et al., "Design of a Phase 2, Multicenter, Randomized, Placebo-Controlled, Double-Blind Study to Assess the Efficacy and Safety of Nipocalimab, an FcRn Antagonist, in Adults With Primary Sjogren's Syndrome", Congress of Clinical Rheumatology West (CCR-W), 2022.
Hubbard, J. et al., "Design of a Phase 2, Multicenter, Randomized, Placebo-Controlled, Double-Blind Study To Assesst the Efficacy and Safety of Nipocalimab, an Forn Antagonist, In Adults With Primary Sjogren's Syndrom", International Symposium on Sjogren's Syndrome (ISSS), 2022.
Hubbard, J. et al., "Designing of a Phase 2, Multicenter, Randomized, Placebo-Controlled, Double-Blind Study to Assess the Efficacy and Safety of Nipocalimab, a Neonatal Fc Receptor Inhibitor, in Adults with Primary Sjogren's Syndrome", Congress of Clinical Rheumatology East, 2023.
Hubbard, J. et al., "Designing of a Phase 2, Multicenter, Randomized, Placebo-Controlled, Double-Blind Study to Assess the Efficacy and Safety of Nipocalimab, an FcRn Inhibitor, in Adults with Primary Sjogren's Syndrome", Arthritis Rheumatol., vol. 74, suppl. 9, 2022.

Jacobson, M. H. et al., "Adverse pregnancy outcomes in myasthenia gravis: A retrospective cohort study in a US health insurance claims database", European Journal of Neurology, vol. 31, Suppl. 1, 2024, pp. 235.
Javidi, M. et al., "IgG reduction explains a large proportion of clinical efficacy in generalized myasthenia gravis: A model-based meta-analysis of FcRn inhibitors", American Association of Neuromuscular and Electrodiagnostic Medicine, 2023, 1 page.
Joachims, M. et al., "CD4+ cytotoxic T lymphocytes (CTL) are present in Sjögren's disease minor salivary glands and associate with markers of epithelial cell damage near infiltrates", American College of Rheumatology (ACR), vol. 74, suppl. 9, 2022, 1 page.
Kigoshi, Y. et al., "Nipocalimab: Phase 1 Study Results in Japanese Healthy Volunteers and Phase2/3 Study in gMG Pediatric Patients", Japanese Society of Child Neurology, 2023.
Kosa, F. et al., "High risk of depression, anxiety, and an unfavorable complex comorbidity profile is associated with SLE: a nationwide patient-level study", Arthritis Research & Therapy, vol. 24, No. 116, May 2022, pp. 1-9.
Kridin, K. et al., "A Retrospective Observational Study to Assess the Risk of Select Adverse Events of Special Interest During Oral Corticosteroid Use in Bullous Pemphigoid Patients", Journal of Investigative Dermatology, vol. 143, S5, 2023, pp. S88.
Kridin, K. et al., "Retrospective Observational Study of Mortality Risk Associated with Oral Corticosteroid Use Among Patients Diagnosed with Bullous Pemphigoid", European Academy of Dermatology and Venereology, 2023, 1 page.
Krumme, A. A. et al., "Characterization of Disease Severity in Neonates from Hemolytic Disease of the Fetus and Newborn-affected Pregnancies", Reprod. Sci., vol. 31, Suppl. 1, 2024, pp. 219A.
Labson, D. D. et al., "Health Care Costs and Resource Utilization Associated With Long-term Medium-to-High Dose Oral Corticosteroid Use in Patients With Dermatomyositis or Polymyositis", Clinical and Experimental Rheumatology, vol. 42, No. 2, 2024, pp. 560.
Lam, E. et al., "Fetal and Neonatal Drug Exposure Following Nipocalimab Treatment in Pregnant Individuals at Risk of Early-onset Severe Hemolytic Disease of the Fetus and Newborn (EOS-HDFN)", American Journal of Obstetrics & Gynecology, vol. 230, S1, 2024, pp. S203.
Leu, J. H. et al., "A Phase 1 Placebo-Controlled Single-Dose Study of Nipocalimab Administered at Different Rates of Intravenous Infusion in Healthy Adults", Brazilian Congress of Hematology Hemotherapy and Cell Therapy (HEMO), Oct. 26-29, 2022, 1 page.
Leu, J. H. et al., "Biodistribution of nipocalimab, an anti-human FcRn antibody, in huFcRn transgenic mice", American College of Clinical Pharmacology (ACCP), Sep. 25-27, 2022, 1 page.
Leu, J. H. et al., "Pharmacokinetics and pharmacodynamics across infusion rates of intravenously administered nipocalimab: results of a phase 1, placebo-controlled study", Front. Neurosci., vol. 18, 1302714, 2024, pp. 01-13.
Leu, J. H. et al., "Pharmacokinetics and Pharmacodynamics of Nipocalimab Administered at Different Rates of Intravenous Infusion in Healthy Participants: Results of a Phase 1 Placebo-Controlled Single-Dose Study", Blood, vol. 140, Supplement 1, 2022, pp. 11039-11040.
Leu, J. H. et al., "Pharmacokinetics of Nipocalimab, A Neonatal Fc Receptor Antagonist, Administered at Different Rates of Intravenous Infusion in Healthy Adults: A Phase 1 Study", American College of Clinical Pharmacology (ACCP), 2022.
Leu, J. H. et al., "Safety and Tolerability of Single Escalating Doses of Intravenous Nipocalimab in Healthy Japanese Adults: A Randomized, Phase 1, Placebo-controlled Study", HemaSphere, vol. 6, Supp. 3, 2022, 2697.
Li, C. et al., "Cell Type-Specific Dysregulation Found to Differentiate Patient Subsets of Sjögren's Disease", Annals of the Rheumatic Diseases, vol. 81, 2022, pp. 1147-1148.
Ling, L. E. et al., "Nipocalimab Can Selectively Target FcRn to Mediate IgG Clearance While Preserving Key Immune Functions", Fall Clinical Dermatology Conference (FCDC), Oct. 20-23, 2022, 1 page.
Ling, L. E. et al., "Nipocalimab pharmacodynamics in a phase 2 study in pregnancies at risk of early-onset severe hemolytic disease

(56) References Cited

OTHER PUBLICATIONS of the fetus and newborn (EOS-HDFN)", Ultrasound in Obstetrics & Gynecology, vol. 62, Suppl. 1), 2023, pp. 1-5.

Ling, L. E. et al., "Nipocalimab's Selective Targeting of FcRn and IgG Clearance Preserves Key Immune Functions", American Academy of Neurology Summer (AAN Summer), Apr. 24-26, 2022, 1 page.

Ling, L. E. et al., "Selective Targeting of FcRn and IgG Clearance by Nipocalimab Preserves Key Immune Functions", Brazilian Congress of Hematology Hemotherapy and Cell Therapy (HEMO), 2022.

Ling, L. et al., "Cellular and In Vivo Preclinical Pharmacodynamics and Pharmacology of Nipocalimab, a High-affinity, Fully Human Anti-FcRn Blocking Therapeutic Antibody", American Association of Neuromuscular and Electrodiagnostic Medicine (AANEM), Nov. 1-4, 2023, 1 page.

Ling, L. et al., "Cellular and In Vivo Preclinical Pharmacodynamics and Pharmacology of Nipocalimab, an Anti-FcRn Blocking Therapeutic Antibody", Neurology, vol. 100, 17_supplement_2, 2023.

Liu-Walsh, "Design of A Phase 2, Multicenter, Randomized, Placebo-Controlled, Parallel-Group, Double-Blind Study To Assess The Efficacy And Safety of Nipocalimab In Adults With Active Systemic Lupus Erythematosus", Asia Pacific League of Associations for Rheumatology (APLAR), 2022.

Liu-Walsh, F. et al., "Efficacy and Safety of Nipocalimab in Adult Patients with Active Systemic Lupus Erythematosus: Design of a Phase 2 Study", Congress of Clinical Rheumatology East, 2023.

Matsushima, N. et al., "Nipocalimab Pharmacokinetics and Pharmacodynamics in Healthy Japanese Adults: A Phase 1 Study", Japanese Society of Hematology (JSH), Oct. 14-16, 2022, 1 page.

Matsuyama, S. et al., "Nipocalimab Dose Selection for A Phase 3 Study in Adult Patients with Generalized Myasthenia Gravis", Japanese Society of Child Neurology, 2024.

McCallion, J. et al., "Anxiety and depression patient-reported outcomes in patients with generalised myasthenia gravis in Europe, Middle East and Africa: A systematic review", European Journal of Neurology, vol. 30, Suppl. 1, 2023, pp. 330-430.

McCallion, J. et al., "Systematic review of the patient burden of generalised myasthenia gravis in Europe, the Middle East, and Africa", BMC Neurology, vol. 24, 2024.

McCallion, J. et al., "The economic burden of haemolytic disease of the foetus and newborn: a systematic literature review", World Congress in Fetal Medicine, 2023.

McCallion, M. P. et al., "The impact of haemolytic disease of the foetus and newborn (HDFN) on developmental outcomes: a systematic literature review", World Congress on Controversies in Obstetrics, Gynecology & Infertility, 2023.

McCrae, K. R. et al., "Identification of a Warm Autoimmune Haemolytic Anaemia (wAIHA) Population Using Predictive Analytics of a Known Clinically Profiled Cohort", Blood, vol. 136, Supplement 1:10 Nov. 5, 2020, https://doi.org/10.1182/blood-2020-138557.

Moise, K. J. et al., "Nipocalimab in pregnancies at high risk for early-onset severe hemolytic disease of the fetus and newborn (EOS-HDFN)", American Academy of Pediatrics, 2023.

Moise, K. J. et al., "Safety and Efficacy of Nipocalimab in Pregnant Individuals at High Risk for Early-Onset Severe Hemolytic Disease of the Fetus and Newborn: Results from the Phase 2 UNITY Study", World Congress in Fetal Medicine, 2023.

Morales, R. M. et al., "Pregnancy Outcomes in Systemic Lupus Erythematosus (SLE): Data from a Multiethnic, Multinational Latin American Cohort", Lupus Science & Medicine, vol. 10, Suppl. 1, 2023, pp. A87-A88.

Murakhovskaya, I. et al., "Characteristics, Treatment Patterns and Healthcare Utilization of Patients With Warm Autoimmune Hemolytic Anemia Initiating First Line Therapy of Oral Corticosteroids With or Without Rituximab", HemaSphere, vol. 7, S3, 2023, 3300.

Murakhovskaya, I. et al., "Efficacy and Safety of Nipocalimab, an FcRn Blocker, in Warm Autoimmune Hemolytic Anemia (wAIHA): ENERGY Phase 2/3 Study Design", Hematology, Transfusion and Cell Therapy, vol. 44, Supplement 2, 2022, p. S11.

Murakhovskaya, I. et al., "ENERGY Trial in Warm Autoimmune Hemolytic Anemia (wAIHA): Design of a Phase 2/3 Randomized, Double-Blind, Placebo-Controlled Study to Assess the Efficacy and Safety of Nipocalimab, an FcRn Blocker", Blood, vol. 140, Supplement 1, 2022, pp. 2443-2444.

Murakhovskaya, I. et al., "Study Design of a Phase 2/3 Randomized, Double-Blind, Placebo-Controlled Study to Assess the Efficacy And Safety of Nipocalimab, an FcRn Antagonist, in Warm Autoimmune Hemolytic Anemia (wAIHA)", Annals of the Rheumatic Diseases, vol. 8, Supp. 1, May 2022, pp. 1751.2-1751.

Murakhovskaya, I. et al., "Study Design of a Phase 2/3, Randomised, Double-blind, Placebo-controlled Study to Assess the Efficacy and Safety of Nipocalimab, an FcRn Antagonist, in Warm Autoimmune Haemolytic Anaemia (wAIHA)", American Society of Hematology (ASH), 2021, 1 page.

Murakhovskaya, I. et al., "Study Design of Energy: A Phase 2/3 Trial to Assess the Efficacy and Safety of Nipocalimab in Warm Autoimmune Hemolytic Anemia", International Congress on Systemic Lupus Erythematosus and the Korean College of Rheumatology Annual Scientific Meeting & International Symposium, 2023.

Murakhovskaya. I. et al., "ENERGY Trial in Warm Autoimmune Hemolytic Anemia (wAIHA): Design of a Phase 2/3 Randomized, Double-Blind, Placebo-Controlled Study to Assess the Efficacy and Safety of Nipocalimab, an FcRn Blocker," Societe Nationale Francaise de Medecine Interne (SNFMI), 2023, Poster presented at SNFM Conference 2023.

Myshkin, E. et al., "Using ACR-component based unsupervised clustering with Olink proteomics to resolve SLE heterogeneity", Lupus 21st Century, 2023.

Najem, C. E. et al., "A phase 2, multicenter, randomized, double-blind, placebo-controlled, parallel-group clinical trial of nipocalimab in participants with active idiopathic inflammatory myopathies (SPIREA): study design", Annals of the Rheumatic Diseases, vol. 83: 1365, 2024.

Najem, C. E. et al., "Design of a Phase 2, Multicenter, Randomized, Double-Blind, Placebo-Controlled, Parallel-Group Study of Nipocalimab in Participants With Active Idiopathic Inflammatory Myopathies (SPIREA)", American Association of Neuromuscular and Electrodiagnostic Medicine (AANEM), 2023.

Najem, C. E. et al., "Design of phase 2, multicenter, randomized, double-blind, placebo-controlled, parallel-group study to evaluate the efficacy and safety of nipocalimab in participants with active idiopathic inflammatory myopathies (SPIREA)", American Academy of Neurology, 2023.

Nieto, R. et al., "The Impact of active lupus nephritis on the quality of life of patients from a Latin American Lupus Cohort", Annals of the Rheumatic Diseases, vol. 83, 2024, pp. 982-983.

Nieto, R. et al., "The impact of active lupus nephritis on work productivity in patients from a Latin American Lupus Cohort", Annals of the Rheumatic Diseases, vol. 83, 2024, pp. 982-983.

Oepkes, "Clinical outcomes of standard of care for early-onset severe HDFN", International Fetal Medical Surgical Society (IFMSS), 2023.

Oepkes, D. et al., "Clinical outcomes of standard of care for early-onset severe hemolytic disease of the fetus and newborn (EOS-HDFN)", American Academy of Pediatrics (AAP), 2023.

Oepkes, D. et al., "Design of a Phase 3 Study of Nipocalimab in Pregnancies at Risk for Severe Hemolytic Disease of the Fetus and Newborn (HDFN)", World Congress in Fetal Medicine, 2023, 1 page.

Oepkes, D. et al., "Phase 3 study design of nipocalimab in pregnancies at risk for severe HDFN", International Fetal Medical Surgical Society, 2023, 1 page.

Oepkes, D. et al., "Safety, Efficacy, and Outcomes of Current Standard of Care in Pregnant Participants and Their Offspring at High Risk of Early-Onset Severe Hemolytic Disease of the Fetus and Newborn: Results from the Prospective Observational CLARITY Study", World Congress in Fetal Medicine, 2023.

Oepkes. D. et al., "Design of a Phase 3 Study of Nipocalimab in Pregnancies at Risk for Severe Hemolytic Disease of the Fetus and

(56) References Cited

OTHER PUBLICATIONS

Newborn (HDFN)," Obstetric Medicine, 2023, Obstetric Medicine 2024 17:1_suppl, 3-31. https://doi.org/10.1177/1753495X231222541.
Panchakshari, R. A. et al., "Pharmacodynamic Effects of Nipocalimab in Patients with Moderate to Severe Active Rheumatoid Arthritis (RA): Results from the Multicenter, Randomized, Double-blinded, Placebo-controlled Phase 2A Iris-Ra Study", Arthritis Rheumatol., vol. 75, Suppl. 9, 2023.
Patel, H. et al., "Quality of Life in Patients with Bullous Pemphigoid", National Organization for Rare Disorders (NORD), Oct. 17-18, 2022, 1 page.
Pesa, J. et al., "Design and Early Insights from a Generalized Myasthenia Gravis (gMG) Patient Engagement Research Council", Muscular Dystrophy Association (MDA), Mar. 10-22, 2023.
Pesa, J. et al., "Myasthenia gravis treatments are associated with negative patient sentiment in digital conversation data", Neurology, vol. 100, 17_supplement_2, 2023.
Pesa, J. et al., "Real World Insights into Differing Clinical Presentation of Myasthenia Gravis Patients on Pharmacological Treatment in the USA and Five European Countries", American Association of Neuromuscular and Electrodiagnostic Medicine, 2023.
Pesa, J. et al., "The impact of generalized Myasthenia Gravis severity on work and daily activities: A real world study", American Academy of Neurology, Apr. 22-27, 2023, poster, 1 page.
Pesa, J. et al., "The impact of myasthenia gravis severity on work and daily activities: a real-world study", Muscle & Nerve, Jan. 26, 2024, pp. 1-12.
Petri, M. et al., "All-Cause Mortality in a Systemic Lupus Erythematosus Cohort", Arthritis Rheumatol., 2022, 1 page.
Querol, L. et al., "Characteristics of Chronic Inflammatory Demyelinating Polyneuropathy subtypes: Results from a Multinational, Real-World Survey", Peripheral Nerve Society, 2024.
Quintana, R. et al., "Lupus Nephritis and response to treatment in Latin America", Annals of the Rheumatic Diseases, vol. 83, 2024, pp. 428-429.
Quintana, R. et al., "Predictors of First Hospitalizations due to Disease Activity and Infections in Systemic Lupus Erythematosus Patients", Lupus Science & Medicine, vol. 10, Suppl. 1, 2023, pp. A54.
Ramchandren, S. et al., "Juvenile Myasthenia Gravis: Utilizing Real World Data to Explore Access to Care and Trials in the US", Muscular Dystrophy Association (MDA), 2022, 1 page.
Ramchandren, S. et al., "Vibrance-mg: A clinical trial of nipocalimab in pediatric myasthenia gravis", American Academy of Neurology (AAN), Jul. 15-16, 2022, 1 page.
Ramchandren, S. et al., "Vibrance-mg: Clinical Trial of Nipocalimab in Pediatric Myasthenia Gravis", National Organization for Rare Disorders, 2023.
Ramchandren, S. et al., "Vivacity MG Phase 3 Study: A Clinical Trial of Nipocalimab Administered to Adults With Generalized Myasthenia Gravis", American Academy of Neurology Summer (AAN Summer), 2022, 1 page.
Ramchandren, S. et al., "Vivacity MG Phase 3 Study: Clinical Trial of Nipocalimab Administered to Adults With Generalized Myasthenia Gravis", American Association of Neuromuscular and Electrodiagnostic Medicine (AANEM), 2022, 1 page.
Ramchandren, S., "Serum IgG and Autoantibody Lowering by the Anti-FcRn Monoclonal Antibody, Nipocalimab, Correlates with Improvement in MG-ADL in Generalized Myasthenia Gravis Patients", American Academy of Neurology Summer (AAN Summer), 2022.
Rinaldi, S. et al., Unmet Need in Patients with Chronic Inflammatory Demyelinating Polyneuropathy: Results from a Real-World Survey, European Journal of Neurology, vol. 31, Suppl. 1, 2024, pp. 410.
Sbarigia, U. et al., "Baseline Characteristics of Patients with SLE Across 5 Registries—The LupusNet Federated Data Network", Annals of the Rheumatic Diseases, 2024.
Schreiber, J. et al., "LupusNet—A Federated Model/Network to Support Real-World Data Research in Systemic Lupus Erythematosus", European Lupus Meeting (EuroLupus), 2022, 1 page.

Scippa, K. et al., "Establishing content validity of the FACIT-Fatigue scale in patients living with Warm Autoimmune Hemolytic Anemia: results from qualitative interview studies", Blood, vol. 142, Supplement 1, 2023, pp. 3753.
Scippa, K. et al., "Patient Experiences and Perspectives of Chronic Inflammatory Demyelinating Polyneuropathy: Development of a Conceptual Model", Peripheral Nerve Society, 2024.
Scippa, K. et al., "Recognizing unmet need in chronic inflammatory demyelinating polyneuropathy: development of a conceptual model characterizing patient experiences and perspectives", Neurology, vol. 102, 17_supplement_1, 2024, 1 page.
Seth, N. et al., "Nipocalimab a High Affinity, Immunoselective Clinical FcRn Blocker with Unique Properties: Observations from Non-clinical and Clinical Studies", Neurology, vol. 102, 17_supplement_1, 2024.
Shen, S.-P. et al., "Healthcare resource utilisation and costs associated with generalised myasthenia gravis: a retrospective matched cohort study using the National Health Insurance Research Database in Taiwan", Front. Neurol., vol. 14:1216595, Jul. 26, 2023, pp. 01-07.
Silverberg, J. I. et al., "Risk of adverse events in patients with bullous pemphigoid treated with oral corticosteroids in the United States", JEADV Clinical Practice, 2024, pp. 1-6.
Silverberg, J. I. et al., "The Risk of Adverse Events in Patients with Bullous Pemphigoid Treated With Oral Corticosteroids in the United States", World Congress of Dermatology, 2023.
Speybroeck, M. V. et al., "Advancing Data Harmonization in a Federated Model/Network for Assessing Patient Characteristics in Systemic Lupus Erythematosus", Lupus 21st Century, 2023.
Spiers, S. et al., "Safety and Tolerability of Nipocalimab Administered at Different Rates of Intravenous Infusion in Healthy Adults: A Phase 1, Placebo-controlled, Single-dose Study", Blood, vol. 140, Supplement 1, 2022, pp. 11039-11040.
Swerdel, J. N. et al., "Using a data-driven approach for the development and evaluation of phenotype algorithms for systemic lupus erythematosus", PLos One, vol. 18, No. 2, e0281929, 2023, pp. 1-13.
Taylor, P. C. et al., "Efficacy and Safety of Nipocalimab in Patients with Moderate to Severe Active Rheumatoid Arthritis (RA): the Multicenter, Randomized, Double-blinded, Placebo-controlled Phase 2a IRIS-RA Study", Arthritis Rheumatol., vol. 75, suppl. 9, 2023.
Taylor, P. C. et al., "Nipocalimab, an anti-FcRn monoclonal antibody, in participants with moderate to severe active rheumatoid arthritis and inadequate response or intolerance to anti-TNF therapy: results from the phase 2a IRIS-RA study", RMD Open, vol. 10, No. 2, 2024, e004278.
Tjoa, M. L. et al., "Estimated prevalence of hemolytic disease of the newborn from 1996 to 2010 in the United States", World Congress on Controversies in Obstetrics, Gynecology & Infertility (COGI), Nov. 24-26, 2022, 1 page.
Tjoa, M. L. et al., "Prevalence of Hemolytic Disease of the Fetus and Newborn in the United States from 1996-2010", National Organization for Rare Disorders (NORD), 2022.
Vaikunthanathan, T. et al., "Designing Energy: A Phase 2/3 Study of Nipocalimab in Warm Autoimmune Hemolytic Anemia", Br. J. Haematol., vol. 201, Suppl. 1, 2023, pp. 31-118.
Vermeulen, A. et al., "Biodistribution of nipocalimab (anti-human FcRn antibody) in huFcRn transgenic mice", Annals of the Rheumatic Diseases, vol. 81, 2022, p. 1172.
Verweij, E. J. T. et al., "Management and Outcomes in Hemolytic Disease of the Fetus and Newborn: a Systematic Literature Review", World Congress in Fetal Medicine, 2024.
Vincente, E. C. et al., "Early-onset generalised myasthenia gravis in women aged 18-50: results from a real-world study in five European countries", European Journal of Neurology, vol. 30, Suppl. 1, 2023, pp. 330-430.
Vincente, E. C. et al., "Fatigue among generalised myasthenia gravis patients: real-world data from physicians and patients across five European countries", European Journal of Neurology, vol. 30, Suppl. 1, 2023, pp. 330-430.
Watanabe. S. et al., Nipocalimab MG Program, Japanese Society of Child Neurology (JSCN), 2023, Oral presented at JSCN conference. 2023.

(56) References Cited

OTHER PUBLICATIONS

West, B. et al., "Partnering with Patients and Care Partners to Guide the Design of a Generalized Myasthenia Gravis Real World Study", American Association of Neuromuscular and Electrodiagnostic Medicine, 2023.
Williams-Hall, R. et al., "Generation of evidence supporting the content validity of SF-36, FACIT-Fatigue, and Lupus-QoL, and novel patient-reported symptom items for use in patients with systemic lupus erythematosus (SLE) and SLE with lupus nephritis (LN)", Lupus Science & Medicine, Aug. 2022, vol. 9, No. 1:e000712.
Winter, D. P. et al., "Hemolytic disease of the fetus and newborn: systematic literature review of the antenatal landscape", BMC Pregnancy and Childbirth, vol. 23, No. 12, 2023, pp. 1-10.
Winter, D. P. et al., "Hemolytic Disease Of The Fetus And Newborn: Systematic Review of Postnatal Care and Outcomes", BMC Pregnancy and Childbirth, vol. 23:738, 2023, pp. 1-10.
Wipfler, K. et al., "Burden of Disease in Refractory Rheumatoid Arthritis", Arthritis Rheumatol., vol. 74, Supp. 9, 2022, 1 page.
Wipfler, K. et al., "Disease Burden, Patient Experiences, and Unmet Needs in Refractory Rheumatoid Arthritis: Insights from 25 Years of Real-World Data", Arthritis Rheumatol., vol. 75, suppl. 9, 2023, 1 page.
Wipfler, K. et al., "Treatment Trajectories and Patient Outcomes in Idiopathic Inflammatory Myopathies", Arthritis Rheumatol., vol. 75, Suppl 9, 2023, 1 page.
Xie, F. et al., "Identifying Hemolytic Disease of the Fetus and Newborn within a Large Integrated Healthcare System", American Journal of Obstetrics & Gynecology, vol. 230, S1, 2024, pp. S274-S275.
Xiong, Y. et al., "Model-based Assessment of Lipid Elevation Related to FcRn-Blocking Antibody Nipocalimab", American Conference on Pharmacometrics, 2023.
Yu, D. et al., "Live birth prevalence of hemolytic disease of the fetus and newborn in the United States from 1996 to 2010", AJOG Global Reports, 100203, 2023, pp. 1-9.
Zhang, N. et al., "Comparison of different assay platforms for acetylcholine receptor antibody detection", American Association of Neuromuscular and Electrodiagnostic Medicine (AANEM), Sep. 21-24, 2022, 1 page.
Zhang, Q. et al., "Real-World Study of Resource Utilization and Productivity Loss among Patients with Myasthenia Gravis in Sweden", American Academy of Neurology Summer (AAN Summer), Apr. 24-26, 2022, 1 page.
Zhou, J. et al., "A Mechanism-based PK/PD Model to Predict Pharmacodynamics-Mediated Drug-Drug Interaction Propensity for Anti-FcRn Antibodies", American College of Clinical Pharmacology (ACCP), Sep. 25-27, 2022, 1 page.
Zhou, J. et al., "Model-based Assessment of Albumin Pharmacodynamics Related to FcRn-Blocking Antibody Nipocalimab", American Conference on Pharmacometrics, 2023.
Zhou, J. et al., "Nipocalimab Pharmacokinetic/Pharmacodynamic and Exposure-Response Modeling in Pregnancies at Risk for Early-onset Severe Hemolytic Disease of the Fetus and Newborn (EOS-HDFN)", American Journal of Obstetrics & Gynecology, vol. 230, S1, 2024, S138.
Zhou, J. et al., "Target-Mediated Drug Disposition (TMDD) Pharmacokinetic and Pharmacodynamic (PK/PD) Modeling of the Anti-FcRn Monoclonal Antibody Nipocalimab Administered to Healthy Subjects", American College of Clinical Pharmacology (ACCP), 2022.
Zhu, Y. et al., "Pharmacokinetics and Pharmacodynamics of Nipocalimab in Healthy Participants and Patients with Generalized Myasthenia Gravis", Journal of Neuromuscular Diseases, vol. 9, 2022, S240.
Kaushik et al., Why Is Trehalose an Exceptional Protein Stabilizer?, 2003, The Journal of Biological Chemistry, vol. 278, No. 29, pp. 26458-26465 (Year: 2003).
Onitsuka et al., Trehalose suppresses antibody aggregation during the culture of Chinese hamster ovary cells, 2014, Journal of Bioscience and Bioengineering, vol. 117, No. 5, pp. 632-638 (Year: 2014).
Wang et al., "Characterization of product-related low molecular weight impurities in therapeutic monoclonal antibodies using hydrophilic interaction chromatography coupled with mass spectrometry," Journal of Pharmaceutical and Biomedical Analysis, vol. 154, May 30, 2018, pp. 468-475.
Yan et al., "Breaking the light and heavy chain linkage of human immunoglobulin G1 (IgG1) by radical reactions," Journal of Biological Chemistry, vol. 286, Issue 28, 2011, pp. 24674-24684.

\* cited by examiner

SEQUENCE LISTING

<160> NUMBER OF SEQ ID NOS: 18

<210> SEQ ID NO 1
<211> LENGTH: 216
<212> TYPE: PRT

<213> ORGANISM: Artificial Sequence
<220> FEATURE:
<223> OTHER INFORMATION: Description of Artificial Sequence: Synthetic polypeptide

<400> SEQUENCE: 1

```
Gln Ser Ala Leu Thr Gln Pro Ala Ser Val Ser Gly Ser Pro Gly Gln
1               5                   10                  15

Ser Ile Thr Ile Ser Cys Thr Gly Thr Gly Ser Asp Val Gly Ser Tyr
            20                  25                  30

Asn Leu Val Ser Trp Tyr Gln Gln His Pro Gly Lys Ala Pro Lys Leu
        35                  40                  45

Met Ile Tyr Gly Asp Ser Glu Arg Pro Ser Gly Val Ser Asn Arg Phe
    50                  55                  60

Ser Gly Ser Lys Ser Gly Asn Thr Ala Ser Leu Thr Ile Ser Gly Leu
65                  70                  75                  80

Gln Ala Glu Asp Glu Ala Asp Tyr Tyr Cys Ser Ser Tyr Ala Gly Ser
                85                  90                  95

Gly Ile Tyr Val Phe Gly Thr Gly Thr Lys Val Thr Val Leu Gly Gln
            100                 105                 110

Pro Lys Ala Ala Pro Ser Val Thr Leu Phe Pro Pro Ser Ser Glu Glu
        115                 120                 125

Leu Gln Ala Asn Lys Ala Thr Leu Val Cys Leu Ile Ser Asp Phe Tyr
    130                 135                 140

Pro Gly Ala Val Thr Val Ala Trp Lys Ala Asp Ser Ser Pro Val Lys
145                 150                 155                 160

Ala Gly Val Glu Thr Thr Thr Pro Ser Lys Gln Ser Asn Asn Lys Tyr
                165                 170                 175

Ala Ala Ser Ser Tyr Leu Ser Leu Thr Pro Glu Gln Trp Lys Ser His
            180                 185                 190

Lys Ser Tyr Ser Cys Gln Val Thr His Glu Gly Ser Thr Val Glu Lys
        195                 200                 205

Thr Val Ala Pro Thr Glu Cys Ser
    210                 215
```

<210> SEQ ID NO 2
<211> LENGTH: 445
<212> TYPE: PRT
<213> ORGANISM: Artificial Sequence
<220> FEATURE:
<223> OTHER INFORMATION: Description of Artificial Sequence: Synthetic polypeptide

<400> SEQUENCE: 2

```
Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Thr Tyr
            20                  25                  30

Ala Met Gly Trp Val Arg Gln Ala Pro Gly Lys Gly Leu Glu Trp Val
        35                  40                  45

Ser Ser Ile Gly Ala Ser Gly Ser Gln Thr Arg Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Leu Ala Ile Gly Asp Ser Tyr Trp Gly Gln Gly Thr Met Val
```

```
               100                 105                 110
Thr Val Ser Ser Ala Ser Thr Lys Gly Pro Ser Val Phe Pro Leu Ala
            115                 120                 125
Pro Ser Ser Lys Ser Thr Ser Gly Gly Thr Ala Ala Leu Gly Cys Leu
130                 135                 140
Val Lys Asp Tyr Phe Pro Glu Pro Val Thr Val Ser Trp Asn Ser Gly
145                 150                 155                 160
Ala Leu Thr Ser Gly Val His Thr Phe Pro Ala Val Leu Gln Ser Ser
                165                 170                 175
Gly Leu Tyr Ser Leu Ser Ser Val Val Thr Val Pro Ser Ser Ser Leu
                180                 185                 190
Gly Thr Gln Thr Tyr Ile Cys Asn Val Asn His Lys Pro Ser Asn Thr
            195                 200                 205
Lys Val Asp Lys Lys Val Glu Pro Lys Ser Cys Asp Lys Thr His Thr
210                 215                 220
Cys Pro Pro Cys Pro Ala Pro Glu Leu Leu Gly Gly Pro Ser Val Phe
225                 230                 235                 240
Leu Phe Pro Pro Lys Pro Lys Asp Thr Leu Met Ile Ser Arg Thr Pro
                245                 250                 255
Glu Val Thr Cys Val Val Val Asp Val Ser His Glu Asp Pro Glu Val
                260                 265                 270
Lys Phe Asn Trp Tyr Val Asp Gly Val Glu Val His Asn Ala Lys Thr
            275                 280                 285
Lys Pro Arg Glu Glu Gln Tyr Ala Ser Thr Tyr Arg Val Val Ser Val
        290                 295                 300
Leu Thr Val Leu His Gln Asp Trp Leu Asn Gly Lys Glu Tyr Lys Cys
305                 310                 315                 320
Lys Val Ser Asn Lys Ala Leu Pro Ala Pro Ile Glu Lys Thr Ile Ser
                325                 330                 335
Lys Ala Lys Gly Gln Pro Arg Glu Pro Gln Val Tyr Thr Leu Pro Pro
                340                 345                 350
Ser Arg Glu Glu Met Thr Lys Asn Gln Val Ser Leu Thr Cys Leu Val
            355                 360                 365
Lys Gly Phe Tyr Pro Ser Asp Ile Ala Val Glu Trp Glu Ser Asn Gly
370                 375                 380
Gln Pro Glu Asn Asn Tyr Lys Thr Thr Pro Pro Val Leu Asp Ser Asp
385                 390                 395                 400
Gly Ser Phe Phe Leu Tyr Ser Lys Leu Thr Val Asp Lys Ser Arg Trp
                405                 410                 415
Gln Gln Gly Asn Val Phe Ser Cys Ser Val Met His Glu Ala Leu His
            420                 425                 430
Asn His Tyr Thr Gln Lys Ser Leu Ser Leu Ser Pro Gly
        435                 440                 445

<210> SEQ ID NO 3
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 3

Thr Gly Thr Gly Ser Asp Val Gly Ser Tyr Asn Leu Val Ser
1               5                   10
```

```
<210> SEQ ID NO 4
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 4

Gly Asp Ser Glu Arg Pro Ser
1               5

<210> SEQ ID NO 5
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 5

Ser Ser Tyr Ala Gly Ser Gly Ile Tyr Val
1               5                   10

<210> SEQ ID NO 6
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 6

Thr Tyr Ala Met Gly
1               5

<210> SEQ ID NO 7
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 7

Ser Ile Gly Ala Ser Gly Ser Gln Thr Arg Tyr Ala Asp Ser
1               5                   10

<210> SEQ ID NO 8
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 8

Leu Ala Ile Gly Asp Ser Tyr
1               5

<210> SEQ ID NO 9
<211> LENGTH: 6
<212> TYPE: PRT
<213> ORGANISM: Artificial Sequence
<220> FEATURE:
<223> OTHER INFORMATION: Description of Artificial Sequence: Synthetic
      6xHis tag
```

```
<400> SEQUENCE: 9

His His His His His His
1               5

<210> SEQ ID NO 10
<211> LENGTH: 23
<212> TYPE: PRT
<213> ORGANISM: Unknown
<220> FEATURE:
<223> OTHER INFORMATION: Description of Unknown:
      atriopeptin sequence

<400> SEQUENCE: 10

Ser Ser Cys Phe Gly Gly Arg Ile Asp Arg Ile Gly Ala Gln Ser Gly
1               5                   10                  15

Leu Gly Cys Asn Ser Phe Arg
            20

<210> SEQ ID NO 11
<211> LENGTH: 7
<212> TYPE: PRT
<213> ORGANISM: Unknown
<220> FEATURE:
<223> OTHER INFORMATION: Description of Unknown:
      atriopeptin sequence

<400> SEQUENCE: 11

Ser Ser Cys Phe Gly Gly Arg
1               5

<210> SEQ ID NO 12
<211> LENGTH: 13
<212> TYPE: PRT
<213> ORGANISM: Unknown
<220> FEATURE:
<223> OTHER INFORMATION: Description of Unknown:
      atriopeptin sequence

<400> SEQUENCE: 12

Ile Gly Ala Gln Ser Gly Leu Gly Cys Asn Ser Phe Arg
1               5                   10

<210> SEQ ID NO 13
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 13

Thr Val Ala Pro Thr Glu Cys Ser
1               5

<210> SEQ ID NO 14
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 14

Ser Cys Asp Lys Thr His Thr Cys Pro Pro Cys Pro Ala Pro Glu Leu
1               5                   10                  15

Leu Gly Gly Pro Ser Val Phe Leu Phe Pro Pro Lys Pro Lys
```

```
<210> SEQ ID NO 15
<211> LENGTH: 4
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 15

Ser Cys Asp Lys
1

<210> SEQ ID NO 16
<211> LENGTH: 26
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 16

Thr His Thr Cys Pro Pro Cys Pro Ala Pro Glu Leu Leu Gly Gly Pro
1               5                   10                  15

Ser Val Phe Leu Phe Pro Pro Lys Pro Lys
            20                  25

<210> SEQ ID NO 17
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (2)..(2)
<223> OTHER INFORMATION: Dehydroalanine

<400> SEQUENCE: 17

Ser Ala Asp Lys Thr His Thr Cys Pro Pro Cys Pro Ala Pro Glu Leu
1               5                   10                  15

Leu Gly Gly Pro Ser Val Phe Leu Phe Pro Pro Lys Pro Lys
            20                  25                  30

<210> SEQ ID NO 18
<211> LENGTH: 4
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (2)..(2)
<223> OTHER INFORMATION: Dehydroalanine

<400> SEQUENCE: 18

Ser Ala Asp Lys
1
```

FCRN ANTIBODY COMPOSITIONS

CROSS-REFERENCE TO RELATED APPLICATIONS

This application is the National Stage of International Patent Application No. PCT/US2019/042615, filed Jul. 19, 2019, which claims the benefit of U.S. Provisional Application No. 62/701,367, filed Jul. 20, 2018, the disclosures of which are incorporated herein by reference in their entireties.

SEQUENCE LISTING

The instant application contains a Sequence Listing which has been submitted electronically in ASCII format and is hereby incorporated by reference in its entirety. Said ASCII copy, created on Jan. 14, 2021, is named "258199_00505_Seq_List_as_filed 14 Jan. 2024.txt" and is 10.2 KB in size.

FIELD OF INVENTION

This disclosure pertains to compositions of Fc receptor (FcRn) antibodies.

BACKGROUND

Numerous autoimmune and alloimmune diseases are mediated by pathogenic antibodies. The stability, activity, and transport of pathogenic antibodies depends on the neonatal Fc receptor (FcRn), a type I transmembrane protein that functions as an IgG- and serum albumin-binding, intracellular vesicular trafficking protein. For example, many fetal and neonatal immune diseases result from the transfer of maternal antibodies from a pregnant subject, especially a pregnant subject with an immunological disease, to the fetus through the human neonatal Fc receptor (FcRn) in the placenta.

SUMMARY

This disclosure pertains to compositions comprising an anti-FcRn antibody, ("M281 compositions"). The compositions include a full, intact antibody (i.e., and antibody having two antibody light chains and two antibody heavy chains) and size variants thereof that not include two antibody heavy chains and two antibody light chains and instead include two antibody heavy chains and only a single antibody light chain. Thus, a M281 pharmaceutical composition can include: an antibody (LHHL) comprising two heavy chains comprising or consisting of the amino acid sequence of SEQ ID NO:2 and two light chains comprising or consisting of the amino acid sequence of SEQ ID NO:1, wherein the composition comprises a major protein component having a molecular weight of 140,000-145,000 Da (e.g., 140,500-143,000 Da) and a minor protein component of molecular weight 118,000-120,000 Da (e.g., 119,000 to 120,000 Da or 119,150-119,350 Da), wherein the major component is at least 80% (81, 82, 83, 84, 85, 86, 87, 88, 89, 90, 91, 92, 93, 94, 95, 96, 97, 98, or 99%) by weight of the protein in the composition and the minor component is at least 0.8%, 1%, 2%, 3% by weight, but no more than 20% (19, 18, 17, 16, 15, 14, 13, 12, 11, 10, 9, 8, 7, 6, 5, or 4%) of the protein in the composition. Thus, for example the minor protein component of molecular weight 118,000-120,000 Da can be 0.8-2%, 1-2%, 0.8-3% or 1-4% by weight of the protein in the composition.

In various embodiments: the major protein component is at least 99% by weight of the protein in the composition; the minor protein component comprises an antibody variant comprising two heavy chains and one light chain; the antibody variant comprises an unpaired heavy chain (comprising or consisting of the amino acid sequence of SEQ ID NO:2) and a paired heavy chain (comprising or consisting of the amino acid sequence of SEQ ID NO:2) and light chain (comprising or consisting of the amino acid sequence of SEQ ID NO:1); wherein the antibody variant comprises an unpaired heavy chain comprising a polypeptide comprising or consisting of the amino acid sequence of SEQ ID NO:2 wherein the C at position 219 is replaced by dehydroalanine; and the minor protein component comprises: a) a first antibody variant comprising an unpaired heavy chain (comprising or consisting of the amino acid sequence of SEQ ID NO:2) and a paired heavy chain (comprising or consisting of the amino acid sequence of SEQ ID NO:2) and light chain (comprising or consisting of the amino acid sequence of SEQ ID NO:); and b) a second antibody variant comprising an unpaired heavy chain comprising a polypeptide comprising or consisting of the amino acid sequence of SEQ ID NO:2 wherein the C at position 219 is replaced by dehydroalanine.

Described herein is a method for preparing a pharmaceutical composition. The method comprising: providing a composition an antibody comprising a heavy chain comprising the amino acid sequence of SEQ ID NO:2 and a light chain comprising the amino acid sequence of SEQ ID NO:1; determining whether the composition comprises a major protein component having a molecular weight of 140,000-145,000 Da (e.g., 140,500-143,000 Da) and a minor protein component of molecular weight 118,000-120,000 Da (e.g., 119,000 to 120,000 Da or 119,150-119,350 Da); combining the composition with one or pharmaceutically acceptable excipients to prepare pharmaceutical composition only if the composition comprises a major protein component having a molecular weight of 140,000-145,000 Da (e.g., 140,500-143,000 Da) and a minor protein component of molecular weight 118,000-120,000 Da (e.g., 119,000 to 120,000 Da or 119,150-119,350 Da).

In various aspects of the method: the prepared pharmaceutical composition comprises 28-32 mg/ml of an antibody comprising a heavy chain comprising the amino acid sequence of SEQ ID NO:2 and a light chain comprising the amino acid sequence of SEQ ID NO:1; the prepared pharmaceutical composition comprising 9-11 mg/ml of an antibody comprising a heavy chain comprising the amino acid sequence of SEQ ID NO:2 and a light chain comprising the amino acid sequence of SEQ ID NO:1; the method further includes combining the composition with one or pharmaceutically acceptable excipients to prepare pharmaceutical composition only if the major component is at least 90% by weight of the protein in the composition and the minor component is at least 3% by weight of the protein in the composition; the determining step comprising electrophoresis or chromatography; and the providing step comprising culturing cells expressing the heavy chain and the light chain.

Unless otherwise defined, all technical and scientific terms used herein have the same meaning as commonly understood by one of ordinary skill in the art to which this invention belongs. Methods and materials are described herein for use in the present invention; other, suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control.

Other features and advantages of the invention will be apparent from the following detailed description and figures, and from the claims.

DETAILED DESCRIPTION

Figure 1:
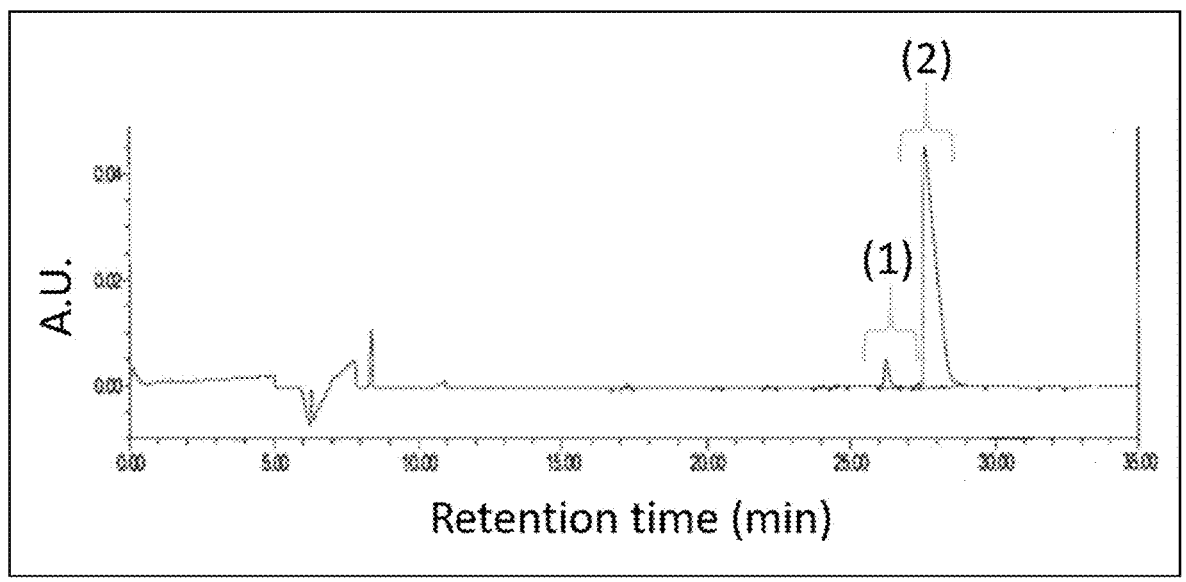
FIG. 1 shows a representative capillary electrophoresis (CE-SDS) electropherogram of the M281 composition measured in non-reduced conditions; the predominant intact IgG labelled as (2) and the size variant labeled as (1).

The present invention features novel compositions comprising an antibody targeted to human neonatal Fc receptor (FcRn). These compositions are useful, e.g., to promote clearance of autoantibodies in a subject, to suppress antigen presentation in a subject, to block an immune response (e.g., block an immune complex-based activation of the immune response in a subject), or to treat immunological diseases (e.g., autoimmune diseases) in a subject. Herein, compositions are disclosed containing the aforementioned isolated antibody and one or more size variants, wherein the final composition contains at least 80% of the total protein content comprising the fully assembled light-heavy-heavy-light chain (LC-HC-HC-LC) having a molecular weight of about 140,000 to 143,000 (e.g., 141,750 to 141,800) Da and up to 5% (45, 3%, 2%, 1%, 0.8%) of the total protein content comprising select size variants of lower molecular weight (e.g., 118,000 to 120,000 Da).

Anti-FcRn Antibodies

Antibodies that can be formulated as described herein include, an antibody having the light chain sequence (SEQ ID NO: 1)
QSALTQPASVSGSPGQSITISCTGTGSDVGSYNLVSWYQQHPGKAPKLMI

YGDSERPSGVSNRFSGSKSGNTASLTISGLQAEDEADYYCSSYAGSGIYV

FGTGTKVTVLGQPKAAPSVTLFPPSSEELQANKATLVCLISDFYPGAVTV

AWKADSSPVKAGVETTTPSKQSNNKYAASSYLSLTPEQWKSHKSYSCQVT

HEGSTVEKTVAPTECS and the heavy chain sequence (SEQ ID NO: 2)
EVQLLESGGGLVQPGGSLRLSCAASGFTFSTYAMGWVRQAPGKGLEWVSS

IGASGSQTRYADSVKGRFTISRDNSKNTLYLQMNSLRAEDTAVYYCARLA

IGDSYWGQGTMVTVSSASTKGPSVFPLAPSSKSTSGGTAALGCLVKDYFP

EPVTVSWNSGALTSGVHTFPAVLQSSGLYSLSSVVTVPSSSLGTQTYICN

VNHKPSNTKVDKKVEPKSCDKTHTCPPCPAPELLGGPSVFLFPPKPKDTL

MISRTPEVTCVVVDVSHEDPEVKFNWYVDGVEVHNAKTKPREEQYASTYR

VVSVLTVLHQDWLNGKEYKCKVSNKALPAPIEKTISKAKGQPREPQVYTL

PPSREEMTKNQVSLTCLVKGFYPSDIAVEWESNGQPENNYKTTPPVLDSD

GSFFLYSKLTVDKSRWQQGNVFSCSVMHEALHNHYTQKSLSLSPG.

Variants of this antibody can also be formulated as described herein. Such variants include: an antibody having a light chain sequence of a variant of SEQ ID NO:1 having 1-5 single amino acid substitution or deletions (and preferably comprising the CDR sequences of SEQ ID Nos: 3-5) and a heavy chain sequence of a variant of SEQ ID NO:24 having 1-5 single amino acid substitution or deletions (and preferably comprising the CDR sequences of SEQ ID Nos: 6-8). Antibodies that are composed of a variant of SEQ ID NO:1 and a variant of SEQ ID NO:4, preferably retain the CDR sequences of M281: TGTGSDVGSYNLVS (light chain CDR1; SEQ ID NO: 3); GDSERPS (light chain CDR2; SEQ ID NO: 4); SSYAGSGIYV (light chain CDR3; SEQ ID NO: 5); TYAMG (heavy chain CDR1; SEQ ID NO: 6); SIGASGSQTRYADS (heavy chain CDR2; SEQ ID NO: 7); and LAIGDSY (heavy chain CDR3; SEQ ID NO: 8).

In some cases, the light chain has a sequence having at least 90%, 95% or 98% identity to:

(SEQ ID NO: 1)
QSALTQPASVSGSPGQSITISCTGTGSDVGSYNLVSWYQQHPGKAPKLMI

YGDSERPSGVSNRFSGSKSGNTASLTISGLQAEDEADYYCSSYAGSGIYV

FGTGTKVTVLGQPKAAPSVTLFPPSSEELQANKATLVCLISDFYPGAVTV

AWKADSSPVKAGVETTTPSKQSNNKYAASSYLSLTPEQWKSHKSYSCQVT

HEGSTVEKTVAPTECS.

In some cases, the heavy chain has a sequence having at least 90%, 95%, or 98% identity to:

(SEQ ID NO: 2)
EVQLLESGGGLVQPGGSLRLSCAASGFTFSTYAMGWVRQAPGKGLEWVSS

IGASGSQTRYADSVKGRFTISRDNSKNTLYLQMNSLRAEDTAVYYCARLA

IGDSYWGQGTMVTVSSASTKGPSVFPLAPSSKSTSGGTAALGCLVKDYFP

EPVTVSWNSGALTSGVHTFPAVLQSSGLYSLSSVVTVPSSSLGTQTYICN

VNHKPSNTKVDKKVEPKSCDKTHTCPPCPAPELLGGPSVFLFPPKPKDTL

MISRTPEVTCVVVDVSHEDPEVKFNWYVDGVEVHNAKTKPREEQYASTYR

VVSVLTVLHQDWLNGKEYKCKVSNKALPAPIEKTISKAKGQPREPQVYTL

PPSREEMTKNQVSLTCLVKGFYPSDIAVEWESNGQPENNYKTTPPVLDSD

GSFFLYSKLTVDKSRWQQGNVFSCSVMHEALHNHYTQKSLSLSPG.

In some cases, the antibody includes amino acid substitutions, additions, and/or deletions in the constant regions (e.g., Fc region) of the antibody that, e.g., lead to decreased effector function, e.g., decreased complement-dependent cytolysis (CDC), antibody-dependent cell-mediated cytolysis (ADCC), and/or antibody-dependent cell-mediated phagocytosis (ADCP), and/or decreased B-cell killing. The constant regions are not involved directly in binding an antibody to its target, but exhibit various effector functions, such as participation of the antibody in antibody-dependent cellular toxicity. In some cases, the antibody is characterized by decreased binding (i.e., absence of binding) to human complement factor C1q and/or human Fc receptor on natural killer (NK) cells. In other cases, the antibody is characterized by decreased binding (i.e., absence of binding) to human FcγRI, FcγRIIA, and/or FcγRIIIA. To alter or reduce an antibody-dependent effector function, such as CDC, ADCC, ADCP, and/or B-cell killing, antibodies may be of the IgG class and contain one or more amino acid substitutions E233, L234, G236, D265, D270, E318, K320, K322, A327, A330, P331, and/or P329 (EU Numbering (Edelman et al., Proc. Natl. Acad. USA, 63:78-85 (1969) throughout unless otherwise indicated). In some cases, the antibody has the mutations L234A/L235A or D265A/N297A. In some cases, the antibody contains amino acid substitution A297N, relative to the sequences of SEQ ID NO: 2, such that the antibody is changed to a glycosylated form. Antibodies with glycosylation at amino acid N297 are expected to bind complement or Fc receptors (i.e., complement C1q binding), while antibodies with N297A (e.g. SEQ ID NO:2) are expected to have very little binding to complement or Fc receptors (i.e., complement C1q binding), indicating low CDC potential. In other cases, M281 does contain a C-terminal lysine at residue 446, relative to SEQ ID NO: 2. In some cases, the amino terminal Gln on the light chain is pyroGln.

Vectors, Host Cells, and Antibody Production

Anti-FcRn antibodies can be produced from a host cell. A host cell refers to a vehicle that includes the necessary cellular components, e.g., organelles, needed to express the polypeptides and constructs described herein from their corresponding nucleic acids. The nucleic acids may be included in nucleic acid vectors that can be introduced into the host cell by conventional techniques known in the art (e.g., transformation, transfection, electroporation, calcium phosphate precipitation, direct microinjection, infection, etc). The choice of nucleic acid vectors depends in part on the host cells to be used. Generally, preferred host cells are of either prokaryotic (e.g., bacterial) or eukaryotic (e.g., mammalian) origin.

Nucleic Acid Vector Construction and Host Cells

A nucleic acid sequence encoding the amino acid sequence of an anti-FcRn antibody may be prepared by a variety of methods known in the art. These methods include, but are not limited to, oligonucleotide-mediated (or site-directed) mutagenesis and PCR mutagenesis. A nucleic acid molecule encoding an anti-FcRn antibody may be obtained using standard techniques, e.g., gene synthesis. Alternatively, a nucleic acid molecule encoding a wild-type anti-FcRn antibody may be mutated to contain specific amino acid substitutions using standard techniques in the art, e.g., QuikChange™ mutagenesis. Nucleic acid molecules can be synthesized using a nucleotide synthesizer or PCR techniques.

Nucleic acid sequences encoding an anti-FcRn antibody may be inserted into a vector capable of replicating and expressing the nucleic acid molecules in prokaryotic or eukaryotic host cells. Many vectors are available in the art and can be used. Each vector may contain various components that may be adjusted and optimized for compatibility with the particular host cell. For example, the vector components may include, but are not limited to, an origin of replication, a selection marker gene, a promoter, a ribosome binding site, a signal sequence, the nucleic acid sequence encoding protein of interest, and a transcription termination sequence.

Mammalian cells can be used as host cells. Examples of mammalian cell types include, but are not limited to, human embryonic kidney (HEK) (e.g., HEK293, HEK 293F), Chinese hamster ovary (CHO), HeLa, COS, PC3, Vero, MC3T3, NS0, Sp2/0, VERY, BHK, MDCK, W138, BT483, Hs578T, HTB2, BT20, T47D, NS0 (a murine myeloma cell line that does not endogenously produce any immunoglobulin chains), CRL7O3O, and HsS78Bst cells. In other can, *E. coli* cells can be used as host cells. Examples of *E. coli* strains include, but are not limited to, *E. coli* 294 (ATCC® 31,446), *E. coli* λ 1776 (ATCC® 31,537, *E. coli* BL21 (DE3) (ATCC® BAA-1025), and *E. coli* RV308 (ATCC® 31,608). Different host cells have characteristic and specific mechanisms for the posttranslational processing and modification of protein products. Appropriate cell lines or host systems may be chosen to ensure the correct modification and processing of the anti-FcRn antibody expressed. The above-described expression vectors may be introduced into appropriate host cells using conventional techniques in the art, e.g., transformation, transfection, electroporation, calcium phosphate precipitation, and direct microinjection. Once the vectors are introduced into host cells for protein production, host cells are cultured in conventional nutrient media modified as appropriate for inducing promoters, selecting transformants, or amplifying the genes encoding the desired sequences. Methods for expression of therapeutic proteins are known in the art, see, for example, Paulina Balbas, Argelia Lorence (eds.) *Recombinant Gene Expres-* sion: *Reviews and Protocols* (*Methods in Molecular Biology*), Humana Press; 2nd ed. 2004 (Jul. 20, 2004) and Vladimir Voynov and Justin A. Caravella (eds.) *Therapeutic Proteins: Methods and Protocols* (*Methods in Molecular Biology*) Humana Press; 2nd ed. 2012 (Jun. 28, 2012).

Protein Production, Recovery, and Purification

Host cells used to produce an anti-FcRn antibody may be grown in media known in the art and suitable for culturing of the selected host cells. Examples of suitable media for mammalian host cells include Minimal Essential Medium (MEM), Dulbecco's Modified Eagle's Medium (DMEM), Expi293™ Expression Medium, DMEM with supplemented fetal bovine serum (FBS), and RPMI-1640. Examples of suitable media for bacterial host cells include Luria broth (LB) plus necessary supplements, such as a selection agent, e.g., ampicillin Host cells are cultured at suitable temperatures, such as from about 20° C. to about 39° C., e.g., from 25° C. to about 37° C., preferably 37° C., and $CO_2$ levels, such as 5 to 10% (preferably 8%). The pH of the medium is generally from about 6.8 to 7.4, e.g., 7.0, depending mainly on the host organism. If an inducible promoter is used in the expression vector, protein expression is induced under conditions suitable for the activation of the promoter.

Protein recovery typically involves disrupting the host cell, generally by such means as osmotic shock, sonication, or lysis. Once the cells are disrupted, cell debris may be removed by centrifugation or filtration. The proteins may be further purified. An anti-FcRn antibody may be purified by any method known in the art of protein purification, for example, by protein A affinity, other chromatography (e.g., ion exchange, affinity, and size-exclusion column chromatography), centrifugation, differential solubility, or by any other standard technique for the purification of proteins. (see *Process Scale Purification of Antibodies*, Uwe Gottschalk (ed.) John Wiley & Sons, Inc., 2009). In some instances, an anti-FcRn antibody can be conjugated to marker sequences, such as a peptide to facilitate purification. An example of a marker amino acid sequence is a hexa-histidine peptide (His-tag), which binds to nickel-functionalized agarose affinity column with micromolar affinity. Other peptide tags useful for purification include, but are not limited to, the hemagglutinin "HA" tag, which corresponds to an epitope derived from the influenza hemagglutinin protein.

Methods of Treatment and Indications

The blockade of human FcRn by the pharmaceutical compositions containing anti-FcRn antibodies described herein may be of therapeutic benefit in diseases that are driven by IgG autoantibodies. The ability of FcRn blockade to induce overall IgG catabolism and removal of multiple species of autoantibodies, small circulating metabolites, or lipoproteins offers a method to expand the utility and accessibility of an autoantibody removal strategy to patients with autoantibody-driven autoimmune disease pathology. Without being bound to any theory, the dominant mechanism of action of an anti-FcRn antibody may be to increase the catabolism of pathogenic autoantibodies in circulation and decrease autoantibody and immune complex deposition in affected tissues.

The pharmaceutical compositions are useful to promote catabolism and clearance of pathogenic antibodies, e.g., IgG and IgG autoantibodies in a subject, to reduce the immune response, e.g., to block immune complex-based activation of the immune response in a subject, and to treat immunological conditions or diseases in a subject. In particular, the pharmaceutical compositions and are useful to reduce or treat an immune complex-based activation of an acute or chronic immune response. The acute immune response may be activated by a medical condition selected from the group consisting of pemphigus vulgaris, lupus nephritis, myasthenia gravis, Guillain-Barré syndrome, antibody-mediated rejection, anti-phospholipid antibody syndrome (e.g., catastrophic anti-phospholipid antibody syndrome), immune complex-mediated vasculitis, glomerulitis, a channelopathy, neuromyelitis optica, autoimmune hearing loss, idiopathic thrombocytopenia purpura (ITP), autoimmune haemolytic anaemia (AIHA), immune neutropenia, dialated cardiomyopathy, and serum sickness. The chronic immune response may be activated by a medical condition selected from the group consisting of chronic inflammatory demyelinating polyneuropathy (CIDP), systemic lupus, a chronic form of a disorder indicated for acute treatment, reactive arthropathies, primary biliary cirrhosis, ulcerative colitis, and antineutrophil cytoplasmic antibody (ANCA)-associated vasculitis.

In some cases, the pharmaceutical compositions are useful to reduce or treat an immune response activated by an autoimmune disease. The autoimmune disease may be selected from the group consisting of alopecia areata, ankylosing spondylitis, antiphospholipid syndrome, Addison's disease, hemolytic anemia, autoimmune hepatitis, hepatitis, Behcet's disease, bullous pemphigoid, cardiomyopathy, celiac sprue-dermatitis, chronic fatigue immune dysfunction syndrome, chronic inflammatory demyelinating polyneuropathy, Churg-Strauss syndrome, cicatricial pemphigoid, limited scleroderma (CREST syndrome), cold agglutinin disease, Crohn's disease, dermatomyositis, discoid lupus, essential mixed cryoglobulinemia, fibromyalgia, fibromyositis, Graves' disease, Hashimoto's thyroiditis, hypothyroidism, inflammatory bowel disease, autoimmune lymphoproliferative syndrome, idiopathic pulmonary fibrosis, IgA nephropathy, insulin dependent diabetes, juvenile arthritis, lichen planus, lupus, Ménière's Disease, mixed connective tissue disease, multiple sclerosis, pernicious anemia, polyarteritis nodosa, polychondritis, polyglandular syndromes, polymyalgia rheumatica, polymyositis, primary agammaglobulinemia, primary biliary cirrhosis, psoriasis, Raynaud's phenomenon, Reiter's syndrome, rheumatic fever, rheumatoid arthritis, sarcoidosis, scleroderma, Sjögren's syndrome, stiff-man syndrome, Takayasu arteritis, temporal arteritis, ulcerative colitis, uveitis, vitiligo, and Wegener's granulomatosis.

In particular, the pharmaceutical compositions are useful to reduce or treat an immune response activated by systemic lupus erythematosus, antiphospholipid syndrome, pemphigus vulgaris/bullous pemphigoid, anti-neutrophil cytoplasmic antibody (ANCA)-associated vasculitis, myasthenia gravis, or neuromyelitis optica.

In some cases, the pharmaceutical compositions are useful to decrease the risk of or decrease the risk of developing anemia in the fetus. In some cases, the pharmaceutical compositions are useful to decrease or obviate the need for IUT (intrauterine transfusion). In some cases, the pharmaceutical compositions and methods are useful to decrease or obviate the need for antenatal PP+IVIg, postnatal transfusion, IVIg, and/or phototherapy.

In some cases, the pharmaceutical compositions are useful to reduce or treat an immune response activated by an autoimmune disease. The autoimmune disease may be selected from the group consisting of alopecia areata, ankylosing spondylitis, antiphospholipid syndrome, Addison's disease, hemolytic anemia, autoimmune hepatitis, hepatitis, Behcets disease, bullous pemphigoid, cardiomyopathy, celiac sprue-dermatitis, chronic fatigue immune dysfunction syndrome, chronic inflammatory demyelinating polyneuropathy, Churg-Strauss syndrome, cicatricial pemphigoid, limited scleroderma (CREST syndrome), cold agglutinin disease, Crohn's disease, dermatomyositis, discoid lupus, essential mixed cryoglobulinemia, fibromyalgia, fibromyositis, Graves' disease, Hashimoto's thyroiditis, hypothyroidism, inflammatory bowel disease, autoimmune lymphoproliferative syndrome, idiopathic pulmonary fibrosis, IgA nephropathy, insulin dependent diabetes, juvenile arthritis, lichen planus, lupus, Ménière's Disease, mixed connective tissue disease, multiple sclerosis, pernicious anemia, polyarteritis nodosa, polychondritis, polyglandular syndromes, polymyalgia rheumatica, polymyositis, primary agammaglobulinemia, primary biliary cirrhosis, psoriasis, Raynaud's phenomenon, Reiter's syndrome, rheumatic fever, rheumatoid arthritis, sarcoidosis, scleroderma, Sjögren's syndrome, stiff-man syndrome, Takayasu arteritis, temporal arteritis, ulcerative colitis, uveitis, vitiligo, and Wegener's granulomatosis.

In some cases, the pharmaceutical compositions are useful to reduce or treat an immune response in a fetus or neonate. In some cases, the pharmaceutical compositions and methods are useful to reduce or treat an immune response in a fetus or neonate activated by an autoimmune disease in the pregnant mother.

In particular, the pharmaceutical compositions are useful to reduce or treat an immune response activated by systemic lupus erythematosus, antiphospholipid syndrome, pemphigus vulgaris/bullous pemphigoid, anti-neutrophil cytoplasmic antibody (ANCA)-associated vasculitis, myasthenia gravis, or neuromyelitis optica. In some cases, the pharmaceutical compositions are useful to reduce or treat an immune response in a fetus or neonate. In some cases, the pharmaceutical compositions and methods are useful to reduce or treat an immune response activated by systemic lupus erythematosus, antiphospholipid syndrome, pemphigus vulgaris/bullous pemphigoid, antineutrophil cytoplasmic antibody (ANCA)-associated vasculitis, myasthenia gravis, or neuromyelitis optica in the pregnant mother.

The pharmaceutical compositions are useful in methods of decreasing pathogenic antibody transport (e.g., pathogenic maternal IgG antibody transport) across the placenta of a pregnant subject, increasing pathogenic antibody catabolism in a pregnant subject, and treating an antibody-mediated enhancement of viral disease in a fetus or a neonate by administering to a pregnant subject an isolated antibody that binds to human FcRn. Diseases and disorders that may benefit from FcRn inhibition by the pharmaceutical compositions described herein include diseases and disorders in a fetus and/or neonate that are caused by the transfer of maternal pathogenic antibodies (e.g., maternal pathogenic IgG antibodies) across the placenta from a pregnant subject to the fetus and/or neonate.

In some cases, the diseases and disorders that may benefit from treatment with the pharmaceutical compositions described herein are fetal and neonatal alloimmune and/or autoimmune disorders. Fetal and neonatal alloimmune disorders are disorders in a fetus and/or neonate that are caused by pathogenic antibodies in the pregnant subject. The pathogenic antibodies in the pregnant subject may attack the antigens of the fetus (e.g., antigens the fetus inherited from the fetus' father), causing the fetus or the neonate to have a fetal and neonatal alloimmune and/or autoimmune disorder.

Examples of fetal and neonatal alloimmune and/or autoimmune disorders that may be treated include, but are not limited to, fetal and neonatal alloimmune thrombocytopenia (FNAIT), hemolytic disease of the fetus and newborn (HDFN), alloimmune pan-thrombocytopenia, congenital heart block, fetal arthrogryposis, neonatal myasthenia gravis, neonatal autoimmune hemolytic anemia, neonatal antiphospholipid syndrome, neonatal polymyositis, dermatomyositis, neonatal lupus, neonatal scleroderma. Bechet's disease, neonatal Graves' disease, neonatal Kawasaki disease, neonatal autoimmune thyroid disease, and neonatal type I diabetes mellitus.

In some cases, the diseases and disorders that may benefit from treatment with the pharmaceutical compositions described herein are viral diseases wherein antibodies facilitate viral entry into host cells, leading to increased or enhanced infectivity in the cells, e.g., antibody-mediated enhancement of viral disease. In some cases, an antibody may bind to a viral surface protein and the antibody/virus complex may bind to an FcRn on a cell surface through interaction between the antibody and the receptor. Subsequently, the antibody/virus complex may get internalized into the cell. For example, a virus may gain entry into the cells and/or tissues of a fetus through forming a complex with a maternal IgG antibody. A maternal IgG antibody may bind to a viral surface protein and the IgG/virus complex may bind to an FcRn in the syncytiotrophoblasts of the placenta, which then transfers the complex into the fetus.

In some cases, the pharmaceutical compositions described herein may be used to treat an antibody-mediated enhancement of viral disease. In some cases, the viral diseases that are enhanced by pathogenic antibodies (e.g., pathogenic IgG antibodies) include, but are not limited to, viral diseases caused by an alpha virus infection, flavivirus infection, Zika virus infection, Chikungunya virus infection, Ross River virus infection, severe acute respiratory syndrome coronavirus infection, Middle East respiratory syndrome, avian influenza infection, influenza virus infection, human respiratory syncytial virus infection, Ebola virus infection, yellow fever virus infection, dengue virus infection, human immunodeficiency virus infection, respiratory syncytial virus infection, Hantavirus infection, Getah virus infection, Sindbis virus infection, Bunyamwera virus infection, West Nile virus infection, Japanese encephalitis virus B infection, rabbitpox virus infection, lactate dehydrogenase elevating virus infection, reovirus infection, rabies virus infection, foot-and-mouth disease virus infection, porcine reproductive and respiratory syndrome virus infection, simian hemorrhagic fever virus infection, equine infectious anemia virus infection, caprine arthritis virus infection, African swine fever virus infection, lentivirus infection, BK papovavirus infection, Murray Valley encephalitis virus infection, enterovirus infection, cytomegalovirus infection, pneumovirus infection, morbillivirus infection, and measles virus infection.

The blockade of human FcRn by anti-FcRn antibodies may be of therapeutic benefit in diseases that are driven by pathogenic antibodies (e.g., pathogenic IgG antibodies). The ability of FcRn blockade to induce overall pathogenic antibody catabolism and removal of multiple species of pathogenic antibodies without perturbing serum albumin, small circulating metabolites, or lipoproteins offers a method to expand the utility and accessibility of a pathogenic antibody removal strategy to patients with pathogenic antibody-driven autoimmune disease pathology. While not bound by theory, the dominant mechanism of action of an anti-FcRn antibody may be to increase the catabolism of pathogenic antibodies in circulation and decrease pathogenic antibody and immune complex deposition in affected tissues.

The pharmaceutical compositions described herein may be administered to a pregnant subject who has or is at risk of having a medical condition that activates an immune response in the pregnant subject. In some cases, the pregnant subject may have had, in the past, a medical condition that activated an immune response in the pregnant subject. In some cases, the pregnant subject has a history of having had a previous fetus or neonate that had a fetal and neonatal alloimmune and/or autoimmune disorder. In some cases, the anti-FcRn antibodies described herein may be administered to a pregnant subject if a pathogenic antibody associated with an immune disease is detected in a biological sample (e.g., a blood or urine sample) obtained from the pregnant subject. In some cases, the pathogenic antibody detected in the biological sample of the pregnant subject is known to bind to an antigen from the fetus in the pregnant subject (e.g., an antigen that the fetus inherited from the fetus' father).

In some cases, the pharmaceutical compositions may be administered to a subject who is planning to become pregnant and who has or is at risk of having a medical condition that activates an immune response in the pregnant subject, and/or who has had, in the past, a medical condition that activated an immune response in the pregnant subject. In some cases, a subject is planning to become pregnant and has a history of having had a previous fetus or neonate that had a fetal and neonatal alloimmune and/or autoimmune disorder. In some cases, the anti-FcRn antibodies described herein may be administered to a subject who is planning to become pregnant and whose biological sample contains a pathogenic antibody associated with an immune disease.

In some cases, the pharmaceutical compositions described herein may be administered to a subject (e.g., a pregnant subject) to reduce or treat an immune complex-based activation of an acute or chronic immune response in the subject. The acute immune response may be activated by a medical condition (e.g., pemphigus vulgaris, lupus nephritis, myasthenia gravis, Guillain-Barré syndrome, antibody-mediated rejection, catastrophic anti-phospholipid antibody syndrome, immune complex-mediated vasculitis, glomerulitis, a channelopathy, neuromyelitis optica, autoimmune hearing loss, idiopathic thrombocytopenia purpura, autoimmune haemolytic anaemia, immune neutropenia, dialated cardiomyopathy, serum sickness, chronic inflammatory demyelinating polyneuropathy, systemic lupus, reactive arthropathies, primary biliary cirrhosis, ulcerative colitis, or antineutrophil cytoplasmic antibody (ANCA)-associated vasculitis).

In some cases, the formulation described herein may be administered to a subject (e.g., a pregnant subject) to reduce or treat an immune response activated by an autoimmune disease. The autoimmune disease may be, for example, alopecia areata, ankylosing spondylitis, antiphospholipid syndrome (e.g., antiphospholipid antibody syndrome), epidermolysis bullosa, membranous nephropathy, Addison's disease, hemolytic anemia, warm autoimmune hemolytic anemia (wAIHA), anti-factor antibodies, heparin induced thrombocytopenia (HICT), sensitized transplant, autoimmune hepatitis, hepatitis, Behcet's disease, bullous pemphigoid, cardiomyopathy, celiac sprue-dermatitis, chronic fatigue immune dysfunction syndrome, chronic inflammatory demyelinating polyneuropathy, Churg-Strauss syndrome, cicatricial pemphigoid, limited scleroderma (CREST syndrome), cold agglutinin disease, Crohn's disease, dermatomyositis, discoid lupus, essential mixed cryoglobulinemia, fibromyalgia, fibromyositis, Graves' disease, Hashimoto's thyroiditis, hypothyroidism, inflammatory bowel disease, autoimmune lymphoproliferative syndrome, idiopathic pulmonary fibrosis, IgA nephropathy, insulin dependent diabetes, juvenile arthritis, lichen planus, lupus, Ménière's Disease, mixed connective tissue disease, multiple sclerosis, pernicious anemia, polyarteritis nodosa, polychondritis, polyglandular syndromes, polymyalgia rheumatica, polymyositis, primary agammaglobulinemia, primary biliary cirrhosis, psoriasis, Raynaud's phenomenon, Reiter's syndrome, rheumatic fever, rheumatoid arthritis, sarcoidosis, scleroderma, Sjögren's syndrome, stiff-man syndrome, Takayasu arteritis, temporal arteritis, ulcerative colitis, uveitis, vitiligo, or Wegener's granulomatosis.

EXAMPLES

The invention is further described in the following examples, which do not limit the scope of the invention described in the claims.

The following materials and methods were used in the Examples set forth herein.

Materials

M281 production: the cell culture producing the light and heavy chains was clarified by centrifugation and filtration, followed by virus inactivation with detergent treatment. Following virus inactivation, material was applied to a protein A column to remove process-related impurities (e.g., host cell proteins (HCP), DNA, and media additives). The eluate applied to an anion exchange column and a virus removal filter. Further filtration over a 30 kDa nominal molecular weight cut-off polyethersulphone membrane was performed post-virus removal and prior to concentration and diafiltration using a buffer of 25 mM sodium phosphate and 25 mM sodium chloride at pH 6.5. Material was formulated by the addition of Trehalose to a final concentration of 8.7% w/w and Polysorbate 80 to a final concentration of 0.01% weight/volume (w/v). The M281 is diluted to a target of 30 mg/mL (range 27-33 mg/mL) with formulation buffer (25 mM sodium phosphate, 25 mM sodium chloride, 8.7% trehalose, 0.01% w/v polysorbate 80, pH 6.5).

Example 1

Detection of Size Variant Species

A size variant species was reproducibly detected in compositions produced using the methods described herein and containing M281 antibody analyzed by non-reduced capillary electrophoresis with SDS (NR CE-SDS).

Results

Compositions of M281 were prepared and analyzed by NR CE-SDS. The electrophoretogram readout of M281 compositions analyzed by NR CE-SDS showed two separate peaks—one peak with retention time 26-27 min and the other peak with retention time 27.5-29 min (FIG. 1). The latter peak corresponded to the fully assembled light-heavy-heavy-light chain (LC-HC-HC-LC), while the former peak corresponded to a size variant molecule with lower weight compared to heavy-heavy-light chain (termed HC-HC-LC or HHL). The level of the size variant molecule as detected by NR CE-SDS remained at about 4.0- to 4.5-percent of the total protein content during all downstream processing steps, GMP DS and DP lots, and during the stability study (data not shown). In addition, there was no significant change in the level of this size variant as detected by NR CE-SDS during the scale-up from 250 L pilot level to GMP 2000 L scale. Levels of this size variant. The formation of the size variant in M281 compositions increased when compositions were exposed to denaturing conditions, such as increased incubation temperature (e.g. from 37° C. to 70° C.) during sample preparation or prior to CE-SDS analysis.

Example 2

Characterization of Molecular Weights for Size Variant Species Detected in M281 Compositions To determine the molecular mass of the size variant species in M281 compositions, M281 compositions were analyzed by three methods, including hydrophilic interaction liquid chromatography coupled to mass spectrometry. (HILIC LC-MS), microchip zone electrophoresis separation with direct electrospray ionization mass spectrometry, and non-reduced tryptic digestion of proteins separated by gel electrophoresis followed by nano liquid chromatography coupled to mass spectrometry.

Results

Figures 2A, 2B:
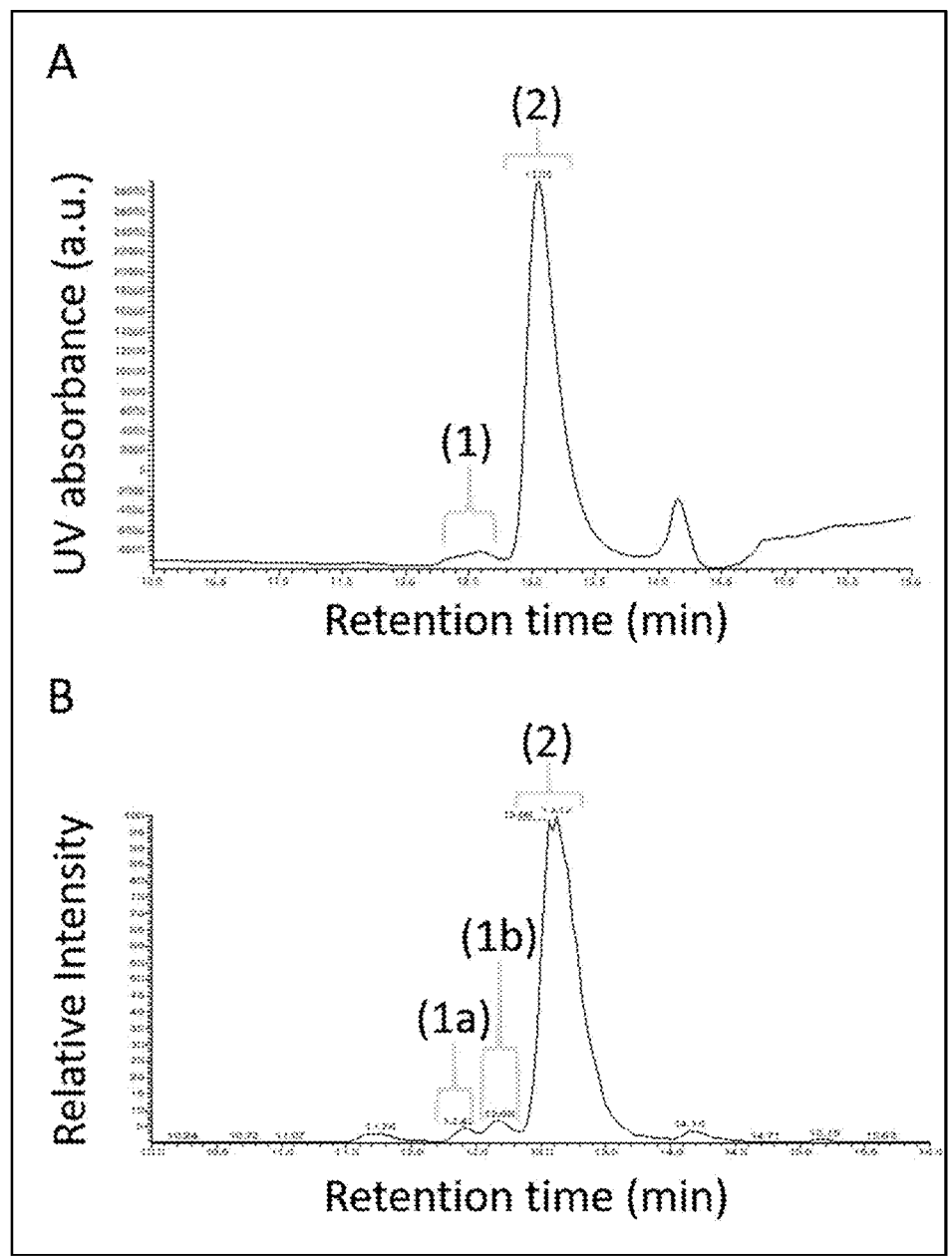
FIG. 2 shows a representative data of the M281 composition analyzed by hydrophilic interaction liquid chromatography coupled to mass spectrometry (HILIC LC-MS); (A) UV chromatogram of the M281 composition analyzed by hydrophilic interaction liquid chromatography with predominant light-heavy-heavy-light chain labeled as (2) and size variant labeled as (1); (B) base peak chromatogram from mass spectrometry with predominant light-heavy-heavy-light chain labeled (2) and size variants labeled as (1a, retention time 12.42 min; 1b, retention time 12.68 min).
Figures 3A, 3B:
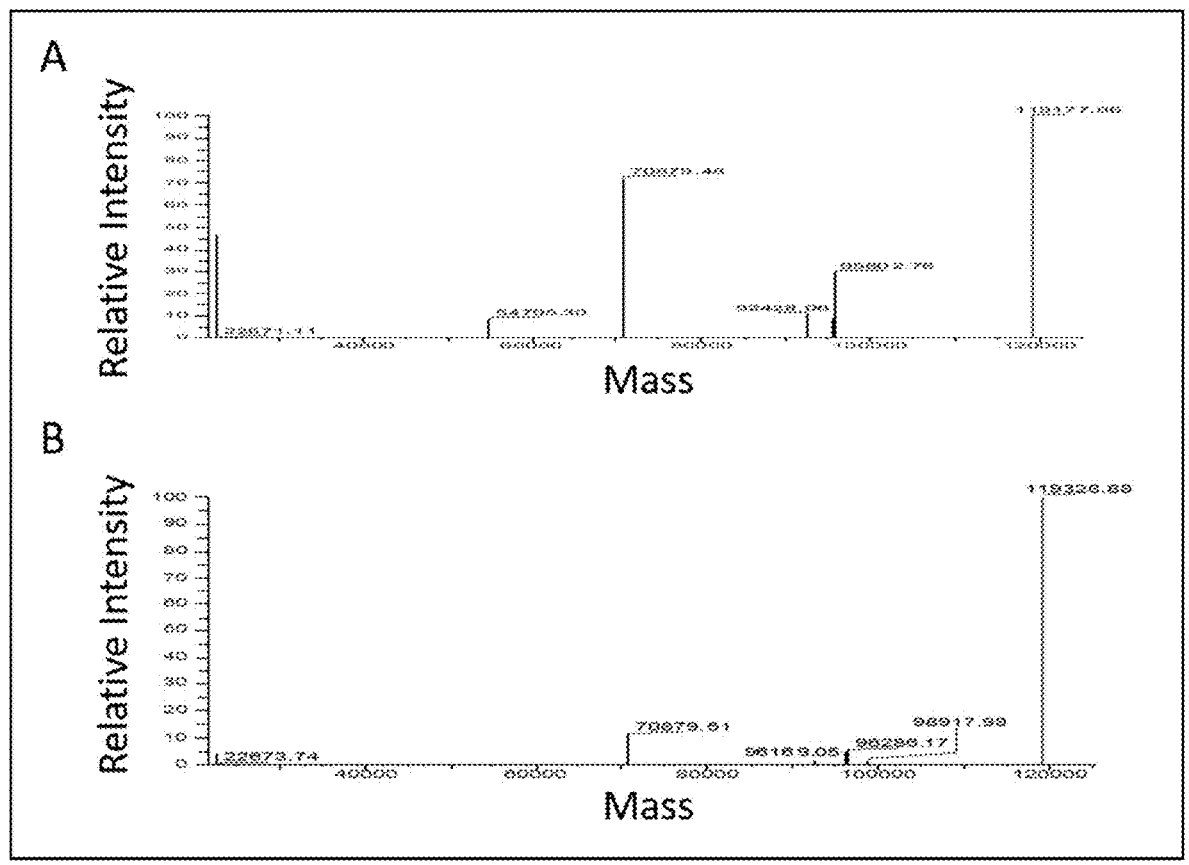
FIGS. 3A-3B shows representative mass spectrometry results of select fractions isolated by hydrophilic interaction liquid chromatography; (A) shows mass spectrometry results of fraction comprising FIG. 2 (1a); (B) shows mass spectrometry results of fraction comprising FIG. 2 (1b).
Figure 4:
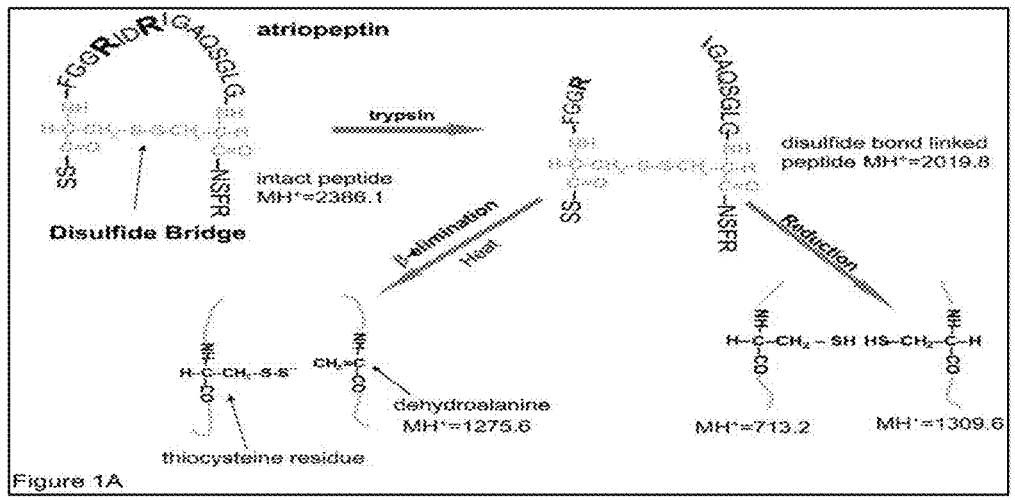
FIG. 4 shows a cartoon representation of a peptide containing a disulfide bridge exposed to trypsin digestion and then either undergoing β-elimination in presence of heat or reduction.

Analysis of the M281 compositions by HILIC LC-MS revealed a peak centered at 12.5 min retention time on the UV chromatogram of HILIC separation (FIG. 2A) that resolved by mass spectrometry to two species—one peak centered at 12.42 min retention time and the other centered at 12.68 min retention time (FIG. 2B). The distribution of molecular masses in the 12.42 min and 12.68 min retention time peaks was determined by deconvolution of the mass spectrums for both peaks. Deconvolution of the mass spectrum of species in the peak at retention time 12.42 min revealed multiple size variants including a dominant species of 119,277 Da (FIG. 3A). The aforementioned dominant species of 119,277 Da was close to the theoretical mass of 119,177 Da for a heavy-heavy-light chain (termed HC-HC-LC or HHL) with dehydroalanine replacing the cysteine at position 219 in the unpaired heavy chain, an expected product from β-elimination of disulfide bond (FIG. 4). Deconvolution of the mass spectrum of species in the peak at retention time 12.68 min revealed multiple size variants including a dominant species of 119,329 Da (FIG. 3B). The aforementioned dominant species of 119,329 Da was close to the theoretical mass of 119,329 Da for a heavy-heavy-light chain (termed HC-HC-LC or HHL) with cysteinylated unpaired heavy chain.

Figure 5:
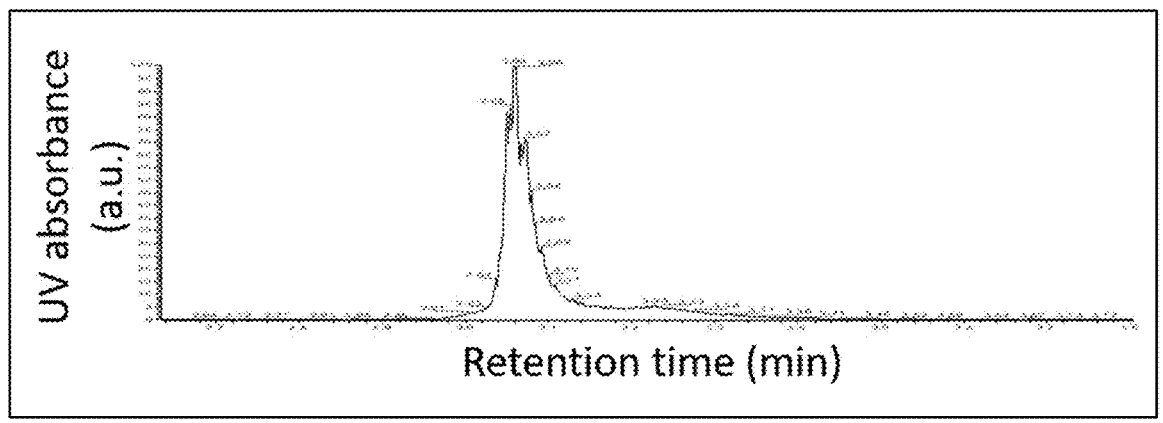
FIG. 5 shows a representative charge electropherogram (CE) of M281 composition; major isoform eluted between 3.03-3.13 min and minor isoform eluted between 3.23-3.31 min.
Figure 6:
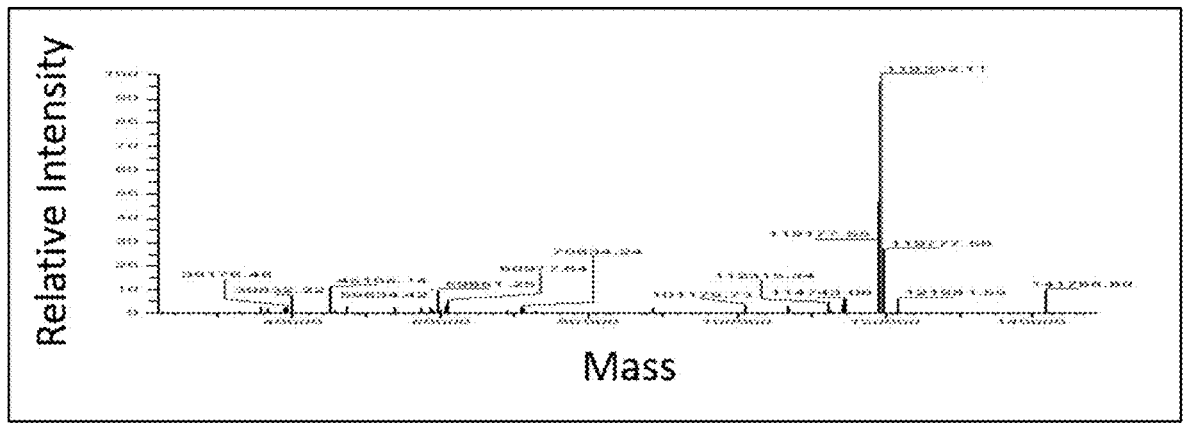
FIG. 6 shows representative masses of isolated sample comprising minor isoform (shown in FIG. 5, fraction eluting between 3.23-3.31 min) following analysis by microchip zone electrophoresis separation with direct electrospray ionization mass spectrometry.

To further characterize the molecular weights of the size variant species in M281 compositions, M281 compositions were analyzed by microchip zone electrophoresis (MZE) separation with direct electrospray ionization mass spectrometry (ESI-MS). The electropherogram of MZE separation showed a minor acidic species with migration time about 3.23 min (FIG. 5). Deconvolution of the mass spectrum of species in the peak eluting around 3.23 min revealed multiple size variants including two dominant species with molecular masses of 119,178 Da and 119, 332 Da. The aforementioned dominant species were close to the theoretical mass of 119,177 Da for a heavy-heavy-light chain (HHL) with dehydroalanine replacing the cysteine at position 219 in the unpaired heavy chain and 119,329 Da for a heavy-heavy-light chain (termed HC-HC-LC or HHL) with cysteinylated unpaired heavy chain, respectively.

Figure 7:
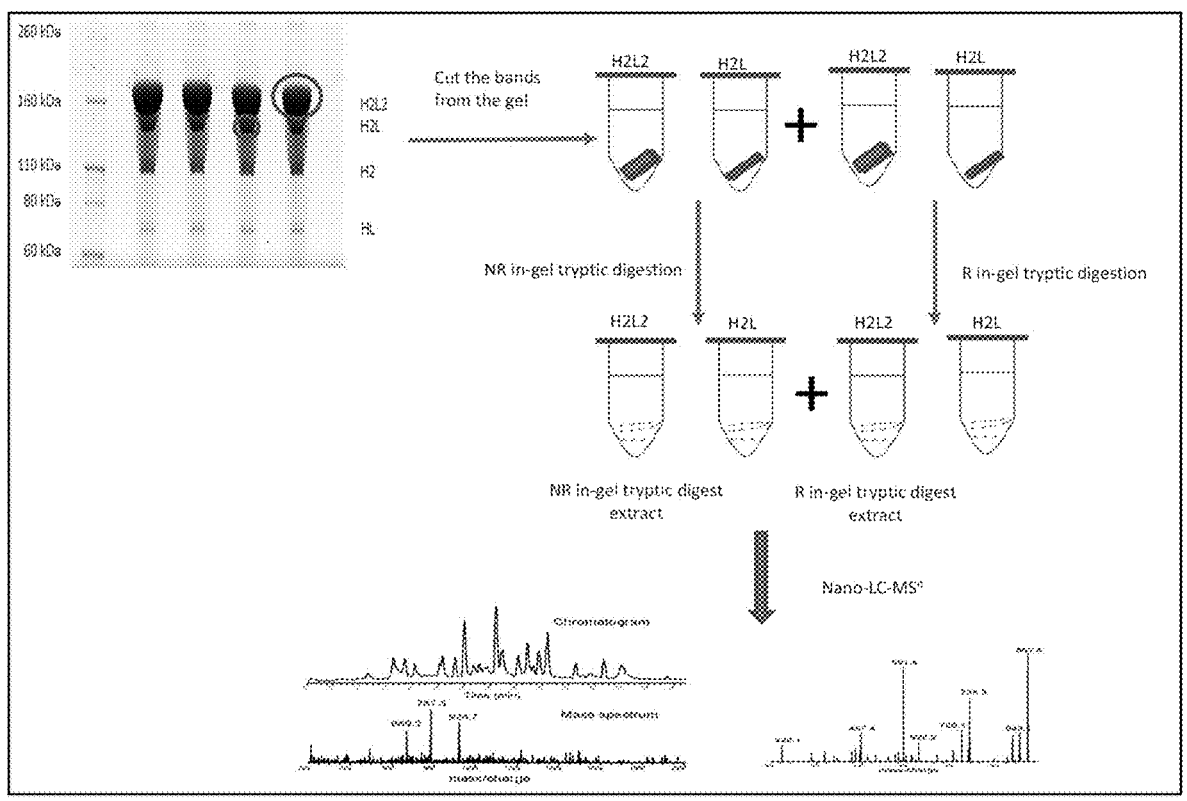
FIG. 7 shows a flow-chart schematic for a method comprising separating compositions by SDS-PAGE gel electrophoresis, isolating select size variants in each composition by cutting pages of SDS-PAGE gel, digesting the isolated size variants with trypsin, and analyzing the of mass distribution of the isolated and trypsin-digested size variants by Nano-LC-MS method.
Figure 8:
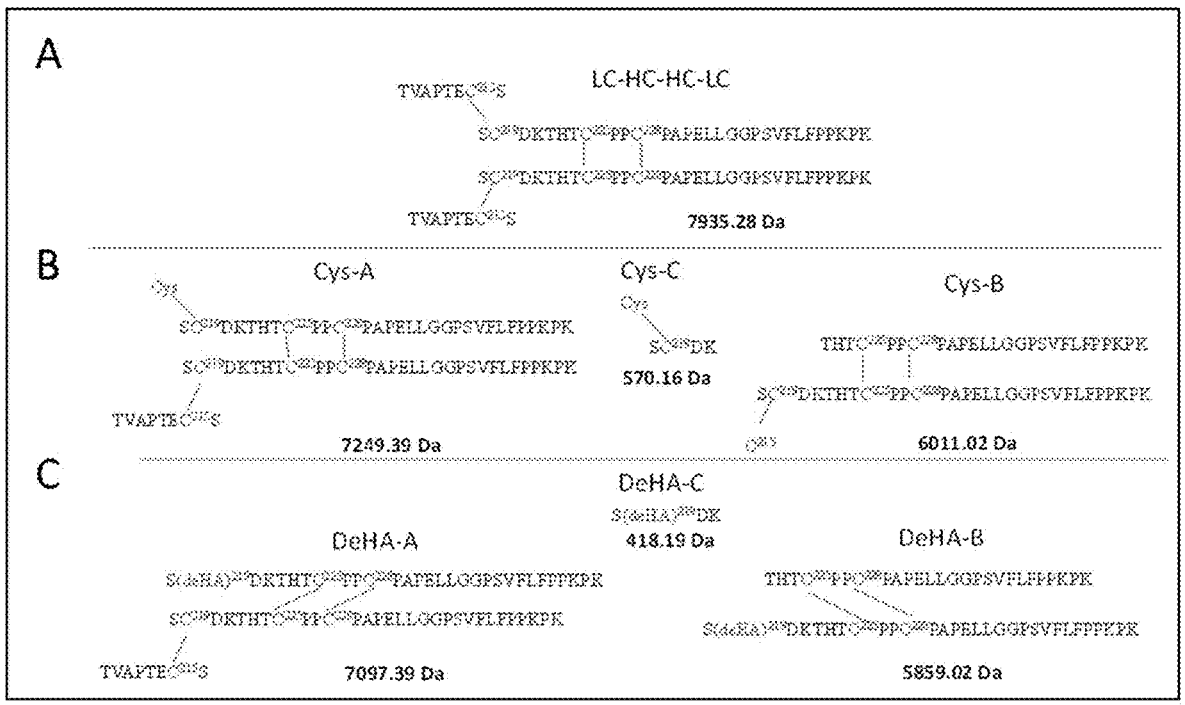
FIG. 8 shows chemical representations and molecular weights of expected peptides resulting from trypsin digestion of (A) light-heavy-heavy-light chain (LC-HC-HC-LC); (B) heavy-heavy-light chain (HC-HC-LC); (C) heavy-heavy-light chain with dehydroalanine substituting Cys219 on the unpaired heavy chain.
Figure 9:
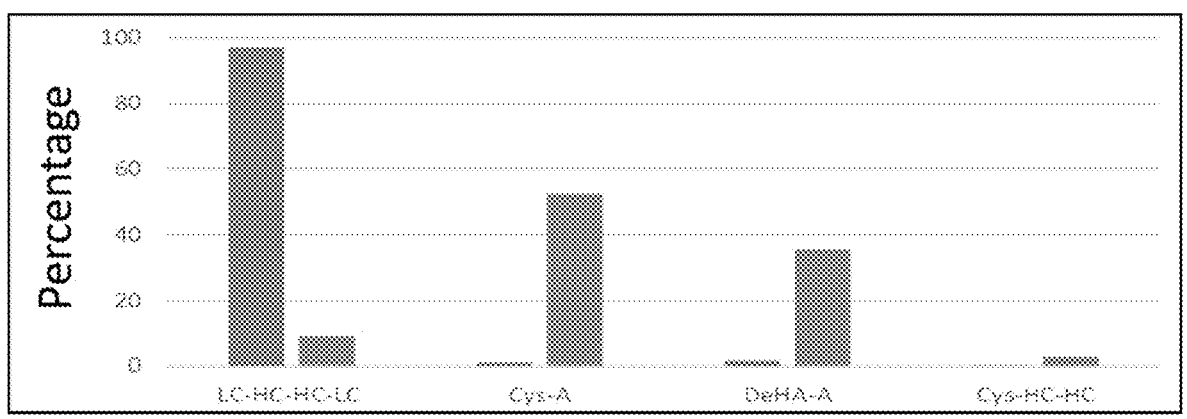
FIG. 9 shows interchain disulfide bond quantification of LC-HC-HC-LC (data shown in blue) and HC-HC-LC (data shown in orange) assessed for isolated compositions containing LC-HC-LC-HC, Cys-A, DeHA-A, and Cys-HC-HC.

To further characterize the molecular weights of the size variant species in M281 compositions, M281 compositions were separated by SDS-PAGE gel electrophoresis and two bands corresponding to light-heavy-heavy-light chain and heavy-heavy-light chain were cut from the gel (as detailed in FIG. 7). The isolated gel fragments were subjected to non-reduced in-gel tryptic digestion and resulting digestion fragments were analyzed by nano liquid chromatography coupled to mass spectrometry (as detailed in FIG. 7). The expected tryptic digested peptides and molecular masses are shown in FIG. 8 for light-heavy-heavy-light chain, heavy-heavy-light chain with cysteinylated unpaired heavy chain, and heavy-heavy-light chain with dehydroalanine substituting cysteine at position 219 (of SEQ ID NO:2) in the unpaired heavy chain. Tryptic digested peptides corresponding to latter two species were detected as dominant species in the band from SDS-PAGE gel electrophoresis corresponding to the heavy-heavy-light chain and as minor species in the band from SDS-PAGE gel electrophoresis corresponding to the light-heavy-heavy-light chain band (Table 1 and FIG. 9).

TABLE 1

Percentages of extracted ion chromatogram (EIC) peak area for each individual characteristic peptide relative to the total EIC peak of all detected

| Characteristic peptide (structure and molecular mass shown in FIG. 8) | Band excised from SDS-PAGE gel electrophoresis | |
|---|---|---|
| | Light-heavy-heavy-light chain (termed LC-HC-HC-LC or LHHL) | Heavy-heavy-light chain (termed HC-HC-LC or HHL). |
| LC-HC-HC-LC | 97.09% | 9.22% |
| Cys-A | 1.08% | 52.43% |
| DeHA-A | 1.71% | 35.52% |
| Cys-HC-HC | 0.12% | 2.84% |

In conclusion, three analytical methods identified the size variant species in M281 compositions as having molecular masses similar to cysteinylated heavy-heavy-light chain and dehydroalanine heavy-heavy-light chain.

In another example, a M281 preparation was prepared and subjected to stability testing upon stored at 5±3° C. The weight percent of protein that was in the 119,150-119,350 Da range (HHL is shown in Table 2).

TABLE 2

Weight percent protein 119,150-119,350 Da

| Time | Weight % 119,150-119,350 Da |
|---|---|
| Initial | 1.0 |
| 1 month | 1.1 |
| 3 months | 1.1 |

What is claimed is:

1. A pharmaceutical composition comprising:
a major protein antibody component comprising a light chain-heavy chain-heavy chain-light chain (LHHL) having a molecular weight of 140,500-143,000 Da, and a minor protein antibody component comprising a heavy chain-heavy chain-light chain (HHL) having a molecular weight 119,150-119,350 Da,
wherein the major protein antibody component is at least 93% by weight of total protein in the composition and the minor protein antibody component is at least 1% by weight of total protein in the composition, and wherein each heavy chain comprises the amino acid sequence of SEQ ID NO: 2 and each light chain comprises the amino acid sequence of SEQ ID NO: 1.

2. The pharmaceutical composition of claim 1, wherein the minor protein antibody component comprises an unpaired heavy chain comprising a polypeptide comprising the amino acid sequence of SEQ ID NO:2, wherein the C at position 219 is replaced by dehydroalanine.

3. The pharmaceutical composition of claim 1, wherein the minor protein antibody component comprises: a) a first antibody variant comprising an HHL; and b) a second antibody variant comprising an unpaired heavy chain comprising a polypeptide comprising the amino acid sequence of SEQ ID NO: 2, wherein the C at position 219 is replaced by dehydroalanine.

4. A method for preparing the pharmaceutical composition of claim 1, comprising:
   providing a composition comprising the major protein antibody component comprising the LHHL, wherein each heavy chain comprises the amino acid sequence of SEQ ID NO: 2 and each light chain comprises the amino acid sequence of SEQ ID NO: 1;
   determining whether the composition comprises the major protein antibody component comprising the LHHL and having a molecular weight of 140,500-143,000 Da and the minor protein antibody component comprising the HHL and having a molecular weight of 119,150-119,350 Da;
   combining the composition with one or more pharmaceutically acceptable excipients to prepare the pharmaceutical composition only if the composition comprises a major protein component having a molecular weight of 140,500-143,000 Da and a minor protein component having a molecular weight of 119,150-119,350 Da,
   wherein the method further comprises combining the composition with one or more pharmaceutically acceptable excipients to prepare the pharmaceutical composition only if the major protein antibody component is at least 93% by weight of total protein in the composition and the minor protein antibody component is at least 1% by weight of total protein in the composition.

5. The method of claim 4, wherein the determining step comprises electrophoresis or chromatography.

6. The method of claim 4, wherein the providing step comprises culturing cells expressing the heavy chain comprising the amino acid sequence of SEQ ID NO: 2 and the light chain comprising the amino acid sequence of SEQ ID NO: 1.

7. The pharmaceutical composition of claim 1, wherein
   (1) each heavy chain of the major protein antibody component comprises the amino acid sequence of SEQ ID NO: 2 and each light chain of the major protein antibody component comprises the amino acid sequence of SEQ ID NO: 1, and
   (2) the minor protein antibody component comprises (i) a first heavy chain having the amino acid sequence of SEQ ID NO: 2 paired to a light chain having the amino acid sequence of SEQ ID NO: 1 and (ii) a second heavy chain comprising the amino acid sequence of SEQ ID NO: 2 or the amino acid sequence of SEQ ID NO: 2, wherein the C at position 219 is replaced by dehydroalanine.

* * * * *